United States Patent
Kanda

(10) Patent No.: US 10,594,922 B2
(45) Date of Patent: Mar. 17, 2020

(54) IMAGE CAPTURING APPARATUS AND CONTROL METHOD THEREOF

(71) Applicant: CANON KABUSHIKI KAISHA, Tokyo (JP)

(72) Inventor: Akihiko Kanda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 16/119,063

(22) Filed: Aug. 31, 2018

(65) Prior Publication Data

US 2019/0075246 A1  Mar. 7, 2019

(30) Foreign Application Priority Data

Sep. 4, 2017  (JP) .................................. 2017-169605

(51) Int. Cl.
| | | |
|---|---|---|
| H04N 5/232 | (2006.01) | |
| H04N 9/04 | (2006.01) | |
| H04N 5/217 | (2011.01) | |
| H04N 9/07 | (2006.01) | |
| H04N 5/347 | (2011.01) | |
| H04N 5/369 | (2011.01) | |
| H04N 5/3745 | (2011.01) | |

(52) U.S. Cl.
CPC ..... *H04N 5/232122* (2018.08); *H04N 5/2173* (2013.01); *H04N 5/232123* (2018.08); *H04N 5/347* (2013.01); *H04N 5/36961* (2018.08); *H04N 5/37457* (2013.01); *H04N 9/0455* (2018.08); *H04N 9/04551* (2018.08); *H04N 9/07* (2013.01)

(58) Field of Classification Search
CPC ................................................. H04N 5/232122
USPC .......................................................... 348/345
See application file for complete search history.

(56) References Cited

U.S. PATENT DOCUMENTS

2013/0321598 A1\* 12/2013 Inoue ....................... G09G 3/20
                                                           348/54
2014/0285707 A1\*  9/2014 Ogawa ................. H04N 5/3572
                                                          348/353

FOREIGN PATENT DOCUMENTS

| JP | 2009-122524 A | 6/2009 |
|---|---|---|
| JP | 2014-182360 A | 9/2014 |
| JP | 2014-187067 A | 10/2014 |

\* cited by examiner

*Primary Examiner* — Joel W Fosselman
(74) *Attorney, Agent, or Firm* — Cowan, Liebowitz & Latman, P.C.

(57) ABSTRACT

An image capturing apparatus includes an image sensor that has a plurality of two-dimensionally arrayed pixels, each of the pixels having a first photoelectric conversion portion and a second photoelectric conversion portion, a generation unit that generates a first image signal by connecting, in a pupil divided direction, a first signal obtained by combining signals of the first photoelectric conversion portions, and generate a second image signal, in the pupil divided direction, a second signal obtained by combining signals of the second photoelectric conversion portions. In a case of combing signals of the first photoelectric conversion portions, or combining signals of the second photoelectric conversion portions, the generation unit decreases weighting of a signal of a photoelectric conversion portion in which an effect of crosstalk from a neighboring photoelectric conversion portion is large.

20 Claims, 15 Drawing Sheets

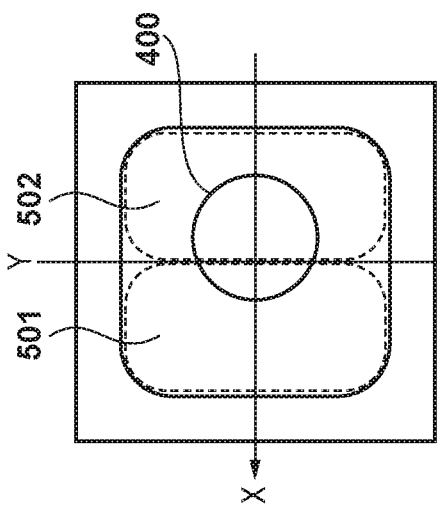
FIG. 7A
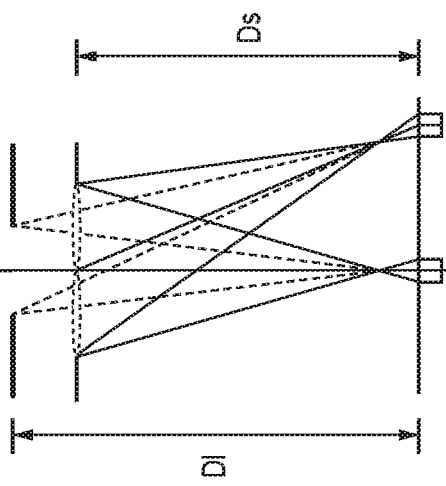
FIG. 7B
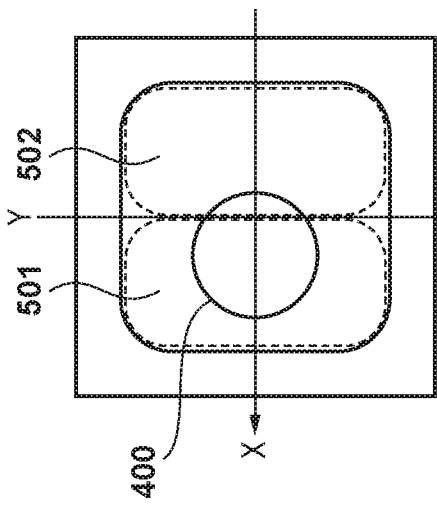
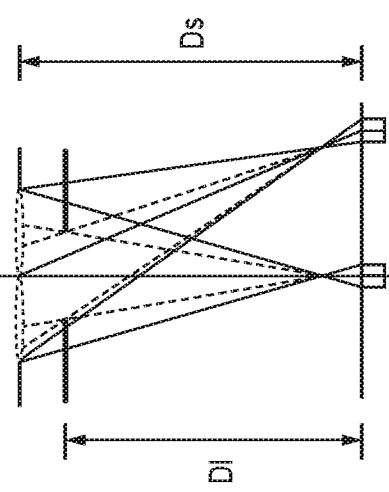
FIG. 7C
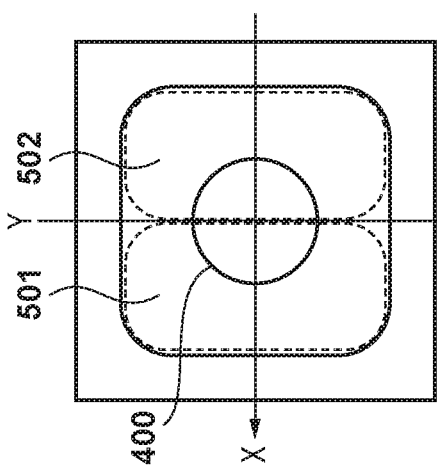
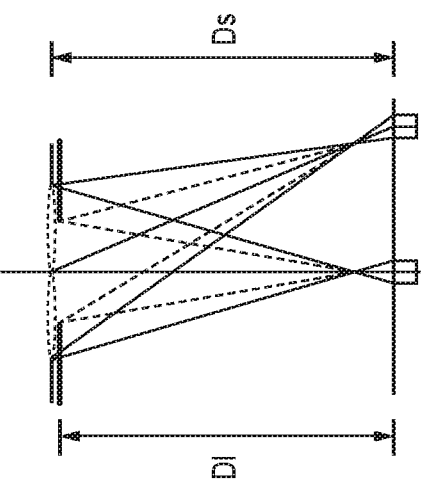

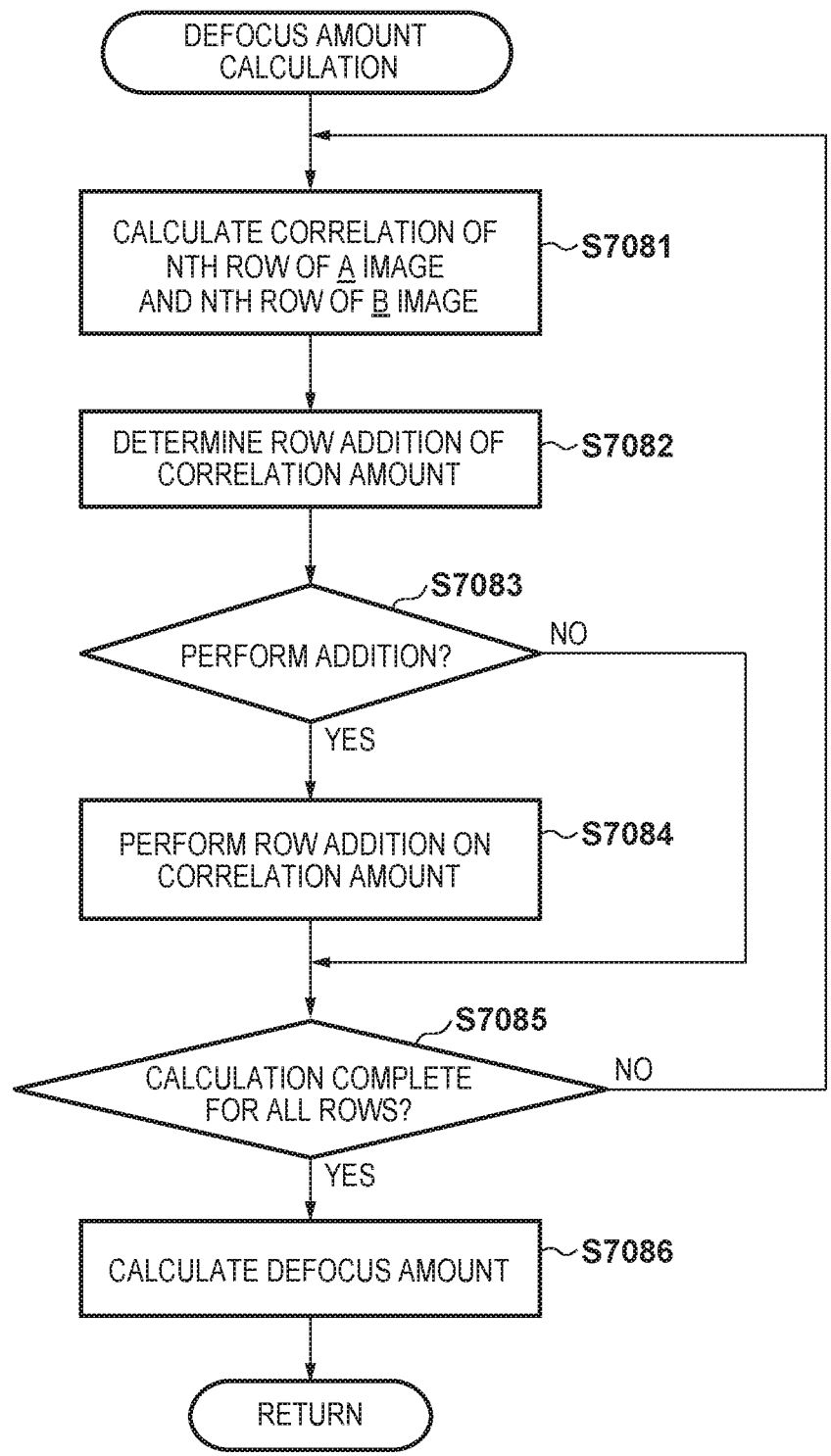
F I G. 15

IMAGE CAPTURING APPARATUS AND CONTROL METHOD THEREOF

BACKGROUND OF THE INVENTION

Field of the Invention

The present invention relates to a focus detection technique in an image capturing apparatus.

Description of the Related Art

Japanese Patent Laid-Open No. 2014-182360 discloses an apparatus that performs pupil division focus detection using an image sensor in which a microlens is formed in each of two-dimensionally arranged pixels. This apparatus has a configuration in which one microlens is shared by two photoelectric conversion portions. Accordingly, in a first photoelectric conversion portion out of the two photoelectric conversion portions that share the microlens, a signal that is based on a light beam passing through a first region in the exit pupil of a taking lens is obtained. In a second photoelectric conversion portion, a signal that is based on a light beam passing through a second region in the exit pupil of the taking lens is obtained. By calculating the correlation between a sequence of signals obtained from a plurality of first photoelectric conversion portions and a sequence of signals obtained from a plurality of second photoelectric conversion portions, the phase difference (deviation amount) between the sequences of signals is calculated, and a defocus amount can be calculated from the phase difference.

In addition, it is possible to obtain an output similar to that of a general pixel having one photoelectric conversion portion for one microlens, by adding outputs of the first photoelectric conversion portion and the second photoelectric conversion portion that share the microlens. Therefore, it is possible to obtain, from one pixel, three types of outputs, namely an output (an A signal) of the first photoelectric conversion portion, an output (a B signal) of the second photoelectric conversion portion, and an addition output (an A+B signal) of the first photoelectric conversion portion and the second photoelectric conversion portion. In Japanese Patent Laid-Open No. 2014-182360, an A+B signal is read out after an output (e.g., an A signal) of one photoelectric conversion portion is read out, and a B signal is generated by subtracting the A signal from the A+B signal without being read out separately. Accordingly, three types of signals can be acquired by performing a readout operation twice.

In addition, Japanese Patent Laid-Open No. 2009-122524 discloses execution of focus detection after excluding, from outputs of photoelectric conversion portions, the effect of crosstalk of neighboring photoelectric conversion portions in order to prevent a decrease in focus detection accuracy. Accordingly, it is possible to reduce the effect of crosstalk, and perform accurate focus detection.

However, in the case of performing focus detection after signal correction through crosstalk correction described in Japanese Patent Laid-Open No. 2009-122524 is complete, there is the following issue. As described in Japanese Patent Laid-Open No. 2009-122524, the amount of crosstalk that occurs changes according to not only an amount of pixel output that causes crosstalk, but also angle of incident light, F-number, image height of a focus detection region, area of a photoelectric conversion portion, distance, and the like. Therefore, a large number of pieces of accurate information is required in order to accurately perform crosstalk correction, and it is difficult to accurately obtain these pieces of information considering manufacturing errors and the like.

On the other hand, Japanese Patent Laid-Open No. 2009-122524 does not mention the reliability of focus detection in the case where a certain amount of error remains even if crosstalk correction is performed. As a result, a method for obtaining a reliable focus detection result in terms of detection accuracy, in focus detection that is based on the assumption of an error remaining in crosstalk correction, is not disclosed.

SUMMARY OF THE INVENTION

The present invention has been made in light of such an issue of a conventional technique, and provides an image capturing apparatus that can obtain an accurate focus detection result even in the case where signals include an error due to the effect of crosstalk, crosstalk correction, and the like.

According to a first aspect of the present invention, there is provided an image capturing apparatus comprising: an image sensor that has a plurality of two-dimensionally arrayed pixels, each of the pixels having a first photoelectric conversion portion that receives a light beam passing through a first pupil region of an exit pupil of an imaging optical system and a second photoelectric conversion portion that receives a light beam passing through a second pupil region of the exit pupil of the imaging optical system different from the first pupil region; a generation unit configured to generate a first image signal, in a pupil divided direction, based on a first signal obtained by combining a signal of the first photoelectric conversion portion to a signal of another neighboring first photoelectric conversion portion, and generate a second image signal, in the pupil divided direction, based on a second signal obtained by combining a signal of the second photoelectric conversion portion to a signal of another neighboring second photoelectric conversion portion; and a focus detection unit configured to detect a phase difference between the first image signal and the second image signal, wherein, in a case of combining a signal of the first photoelectric conversion portion to a signal of another neighboring first photoelectric conversion portion, or combining a signal of the second photoelectric conversion portion to a signal of another neighboring second photoelectric conversion portion, the generation unit decreases weighting of a signal of a photoelectric conversion portion in which an effect of crosstalk from a neighboring photoelectric conversion portion is large, and performs combining.

According to a second aspect of the present invention, there is provided a controlling method of an image capturing apparatus including an image sensor that has a plurality of two-dimensionally arrayed pixels, each of the pixels having a first photoelectric conversion portion that receives a light beam passing through a first pupil region of an exit pupil of an imaging optical system and a second photoelectric conversion portion that receives a light beam passing through a second pupil region of the exit pupil of the imaging optical system different from the first pupil region, the method comprising: generating a first image signal by connecting, in a pupil divided direction, a first combined signal obtained by combining a signal of the first photoelectric conversion portion to a signal of another neighboring first photoelectric conversion portion, and generating a second image signal by connecting, in the pupil divided direction, a second combined signal obtained by combining a signal of the second photoelectric conversion portion to a signal of another neighboring second photoelectric conversion portion; and detecting a phase difference between the first image signal and the second image signal, wherein, in the generating, in a case of combining a signal of the first photoelectric conversion portion to a signal of another neighboring first photoelectric conversion portion, or combining a signal of the second photoelectric conversion portion to a signal of another neighboring second photoelectric conversion portion, weighting of a signal of a photoelectric conversion portion in which an effect of crosstalk from a neighboring photoelectric conversion portion is large is decreased, and combining is performed.

According to a third aspect of the present invention, there is provided an image capturing apparatus comprising: an image sensor that has a plurality of two-dimensionally arrayed pixels, each of the pixels having a first photoelectric conversion portion that receives a light beam passing through a first pupil region of an exit pupil of an imaging optical system and a second photoelectric conversion portion that receives a light beam passing through a second pupil region of the exit pupil of the imaging optical system different from the first pupil region; and at least one processor or circuit configured to perform the operations of the following units: a generation unit configured to generate a first image signal, in a pupil divided direction, based on a first signal obtained by combining a signal of the first photoelectric conversion portion to a signal of another neighboring first photoelectric conversion portion, and generate a second image signal, in the pupil divided direction, based on a second signal obtained by combining a signal of the second photoelectric conversion portion to a signal of another neighboring second photoelectric conversion portion; and a focus detection unit configured to detect a phase difference between the first image signal and the second image signal, wherein, in a case of combining a signal of the first photoelectric conversion portion to a signal of another neighboring first photoelectric conversion portion, or combining a signal of the second photoelectric conversion portion to a signal of another neighboring second photoelectric conversion portion, the generation unit decreases weighting of a signal of a photoelectric conversion portion in which an effect of crosstalk from a neighboring photoelectric conversion portion is large, and performs combining.

Further features of the present invention will become apparent from the following description of exemplary embodiments with reference to the attached drawings.

BRIEF DESCRIPTION OF THE DRAWINGS

FIGS. 7A to 7C are diagrams for describing pupil regions corresponding to photoelectric conversion portions at a peripheral image height of an image sensor.

FIG. 15 is a flowchart showing an example of a method for calculating a defocus amount in an embodiment.

DESCRIPTION OF THE EMBODIMENTS

Exemplary embodiments of the present invention will be described in detail below with reference to the attached drawings. Here, embodiments will be described in which a focus detection apparatus according to the present invention is applied to an interchangeable-lens digital single-lens reflex camera (a camera system). However, the present invention can be applied to any electronic devices having an image sensor that can generate signals to be used in focus detection of a phase difference detection method. Such electronic devices include general cameras such as digital still cameras and digital video cameras, and mobile phone devices, computer devices, media players, robot devices, gaming devices, home electric appliances and the like that have a camera function, but there is no limitation thereto.

Figure 1:
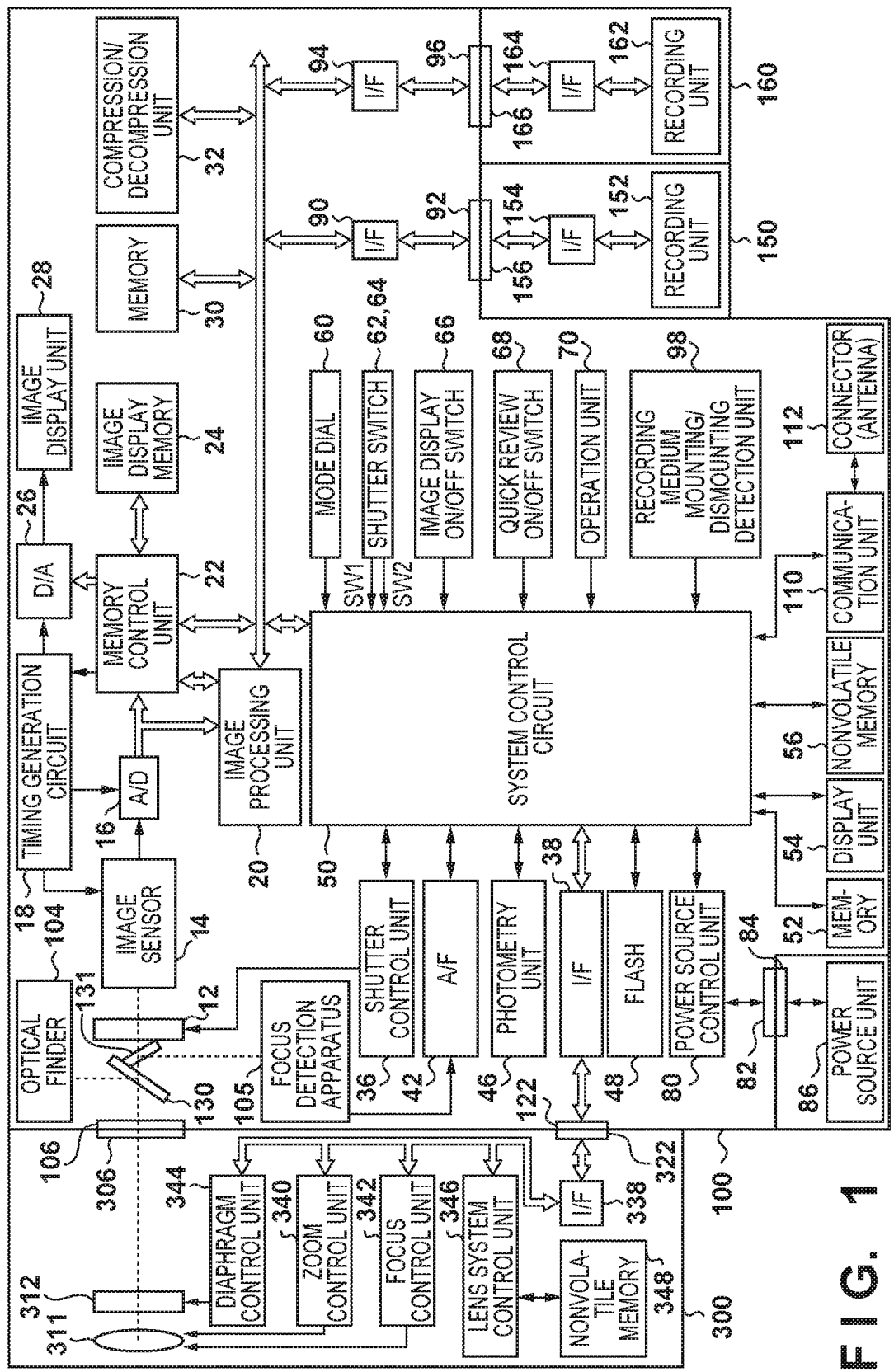
FIG. 1 is a block diagram showing an example of a functional configuration of an image capturing apparatus according to an embodiment of the present invention.

FIG. 1 is a diagram showing a configuration example of a camera system constituted by a camera with an interchangeable taking lens and a taking lens, as an embodiment of an image capturing apparatus of the present invention. In FIG. 1, the camera system is constituted by a camera 100 and an interchangeable taking lens 300.

A light beam passing through the taking lens 300 passes through a lens mount 106, is reflected upward by a main mirror 130, and is incident to an optical finder 104. The optical finder 104 makes it possible for a photographer to shoot a subject while observing a subject optical image. Some functions of a display unit 54, for example, in-focus indication, camera shake alert display, aperture value display, exposure correction display, and the like, which will be described later, are installed in the optical finder 104.

A portion of the main mirror 130 is made by a semi-transmissive half mirror, and a portion of a light beam that is incident to the main mirror 130 passes through this half mirror portion, is reflected downward by a sub mirror 131, and is incident to a focus detection apparatus 105. The focus detection apparatus 105 is a focus detection apparatus that adopts a phase difference detection method, and that has a secondary imaging optical system and a line sensor, and outputs a pair of image signals to an AF unit (autofocus unit) 42. In the AF unit 42, phase difference detection calculation is performed on a pair of image signals, and the defocus amount and the defocus direction of the taking lens 300 are obtained. Based on this calculation result, a system control unit 50 causes a focus control unit 342 (to be described later) of the taking lens 300 to perform driving control of a focus lens.

In the case of performing still image shooting, electronic finder display, or moving image shooting when focus adjustment processing of the taking lens 300 ends, the main mirror 130 and the sub mirror 131 are retracted from the light path using a quick return mechanism (not illustrated). In this case, a light beam passing through the taking lens 300, and is incident to the camera 100 can enter an image sensor 14 via a shutter 12 for controlling the exposure light amount. After a shooting operation performed by the image sensor 14 ends, the main mirror 130 and the sub mirror 131 return to positions as illustrated.

The image sensor 14 is a CCD or CMOS image sensor, and has a configuration in which a plurality of pixels that have photoelectric conversion regions (or photodiodes) are two-dimensionally arranged. The image sensor 14 outputs electrical signals corresponding to a subject optical image. Electrical signals obtained by the image sensor 14 performing photoelectric conversion are sent to an A/D converter 16, and analog signal outputs are converted into digital signals (image data). Note that the A/D converter 16 may be incorporated in the image sensor 14 as will be described later.

The image sensor 14 in this embodiment is configured such that at least some pixels have a plurality of photoelectric conversion regions (or photodiodes). As described above, pixels having such a configuration can output signals that are used for focus detection of a phase difference detection method. Therefore, even in a case where the main mirror 130 and the sub mirror 131 retreat from the light path due to the quick return mechanism, and light does not enter the focus detection apparatus 105, it is possible to perform focus detection of a phase difference detection method using outputs of the image sensor 14.

A timing generation circuit 18 supplies clock signals and control signals to the image sensor 14, the A/D converter 16, and a D/A converter 26. The timing generation circuit 18 is controlled by a memory control unit 22 and the system control unit 50. The system control unit 50 controls the timing generation circuit 18 so as to supply, to the image sensor 14, control signals for reading out outputs of some photoelectric conversion regions from the pixels that have a plurality of photoelectric conversion regions, and additively reading outputs of all the photoelectric conversion regions.

An image processing unit 20 applies predetermined processing such as pixel interpolation processing, white balance adjustment processing, and color conversion processing to image data from the A/D converter 16 or image data from the memory control unit 22.

The image processing unit 20 also generates a pair of sequences of signals that are used for focus detection of a phase difference detection method, from output signals that are used for generating signals for focus detection, out of image data from the A/D converter 16 (output signals of the image sensor 14). After that, the pair of sequences of signals are sent to the AF unit 42 via the system control unit 50. The AF unit 42 detects a deviation amount (shift amount) between the sequences of signals by calculating a correlation between the pair of sequences of signals, and converts the deviation amount into a defocus amount and defocus direction of the taking lens 300. The AF unit 42 outputs the defocus amount and defocus direction after the conversion to the system control unit 50. The system control unit 50 drives the focus lens through the focus control unit 342 of the taking lens 300, and adjusts the focal distance of the taking lens 300.

In addition, the image processing unit 20 can calculate a contrast evaluation value based on signals for generating normal image data (corresponding to the above-described A+B signal) that is obtained from the image sensor 14. The system control unit 50 performs shooting using the image sensor 14 while changing the focus lens position through the focus control unit 342 of the taking lens 300, and examines a change in the contrast evaluation value calculated by the image processing unit 20. The system control unit 50 then drives the focus lens to a position at which the contrast evaluation value is the largest. The camera 100 of this embodiment can also perform focus detection by a contrast detection method in this manner.

Therefore, even when the main mirror 130 and the sub mirror 131 have retreated to the outside of the light path, such as during live view display and moving image shooting, the camera 100 can perform focus detection using both a phase difference detection method and a contrast detection method based on signals obtained from the image sensor 14. Also, in normal still image shooting in which the main mirror 130 and the sub mirror 131 are in the light path, in the camera 100, the focus detection apparatus 105 can perform focus detection of a phase difference detection method. In this manner, the camera 100 can perform focus detection in any state, for example, during still image shooting, live view display, and moving image shooting.

The memory control unit 22 controls the A/D converter 16, the timing generation circuit 18, the image processing unit 20, an image display memory 24, the D/A converter 26, a memory 30, and a compression/decompression unit 32. Data in the A/D converter 16 is then written to the image display memory 24 or the memory 30 via the image processing unit 20 and the memory control unit 22, or only via the memory control unit 22. Image data that is to be displayed and is written in the image display memory 24 is displayed on an image display unit 28 constituted by a liquid crystal monitor or the like, via the D/A converter 26. By sequentially displaying a moving image shot using the image sensor 14 on the image display unit 28, an electronic finder function (live view display) can be realized. The image display unit 28 can turn on/off display according to an instruction of the system control unit 50, and in the case where display is turned off, power consumption of the camera 100 can be reduced significantly.

Moreover, the memory 30 is used for temporarily storing still images and moving images that have been shot, and has a sufficient storage capacity for storing a predetermined number of still images and a moving image of a predetermined time. This makes it possible to write a large amount of image data to the memory 30 at a high speed even in a case of continuous shooting or panoramic shooting. The memory 30 can also be used as a work area of the system control unit 50. The compression/decompression unit 32 has a function for compressing and decompressing image data through Adaptive Discrete Cosine Transform (ADCT) or the like, and reads images stored in the memory 30, performs compression processing or decompression processing, and writes the processed image data back to the memory 30.

A shutter control unit 36 controls the shutter 12 based on photometry information from a photometry unit 46, in cooperation with a diaphragm control unit 344 that controls a diaphragm 312 of the taking lens 300. An interface unit 38 and a connector 122 electrically connect the camera 100 and the taking lens 300 to each other. The interface unit 38 and the connector 122 have a function for transmitting control signals, state signals, data signals, and the like between the camera 100 and the taking lens 300, and also supplying currents of various voltages. In addition, a configuration may be adopted in which such signals are transmitted through not only electric communication but also optical communication, sound communication and the like.

The photometry unit 46 performs automatic exposure control (AE) processing. The luminance of a subject optical image can be measured by allowing a light beam passing through the taking lens 300 to enter the photometry unit 46 via the lens mount 106, the main mirror 130, and a photometry lens (not illustrated). The photometry unit 46 can determine exposure conditions using a program diagram in which subject luminances and exposure conditions are associated with each other, and the like. Also, the photometry unit 46 has a dimming processing function in cooperation with a flash 48. Note that the system control unit 50 can also cause the shutter control unit 36 and the diaphragm control unit 344 of the taking lens 300 to perform AE control, based on a result of the image processing unit 20 calculating image data of the image sensor 14. The flash 48 has a light projecting function for an AF auxiliary light and a flash adjusting function.

The system control unit 50 has a programmable processor such as a CPU or an MPU, and controls overall operations of a camera system by executing a program stored in advance. A nonvolatile memory 52 stores constants, variables, programs and the like for operating the system control unit 50. For example, the display unit 54 is a liquid crystal display apparatus that displays an operation state, a message, and the like using characters, an image, sound, and the like according to the system control unit 50 executing a program. One or more display units 54 are installed at positions near the operation unit of the camera 100 at which it is easy to visually recognize the display units 54, and are each constituted by a combination of an LCD, LED, and the like. Display contents that are displayed on the LCD or the like from among display contents of the display unit 54 include information regarding the number of shooting images such as the number of images to be recorded and the remaining number of images that can be shot, and information regarding shooting conditions such as shutter speed, aperture value, exposure correction, and flash. In addition, battery remaining capacity, time and date, and the like are also displayed. Moreover, some functions of the display unit 54 are installed in the optical finder 104, as described above.

A nonvolatile memory 56 is an electrically erasable/recordable memory, and an EEPROM is used as the nonvolatile memory 56, for example. Reference numerals 60, 62, 64, 66, 68 and 70 indicate operation units for inputting various operation instructions of the system control unit 50, and are constituted by one or more combinations of switches, dials, a touch panel, pointing through sight line detection, a sound recognition apparatus, and the like.

A mode dial 60 can switch and set function modes such as power source off, an automatic shooting mode, a manual shooting mode, a playback mode, and a PC connection mode. A shutter switch SW1 indicated by reference numeral 62 is turned on when a shutter button (not illustrated) is half-pressed, and instructs operation start of AF processing, AE processing, AWB processing, EF processing, and the like. A shutter switch SW2 indicated by reference numeral 64 is turned on when the shutter button is fully pressed, and instructs operation start of a series of processing related to shooting. A series of processing related to shooting refers to exposure processing, developing processing, recording processing, and the like. In exposure processing, signals that have been read out from the image sensor 14 are written as image data to the memory 30 via the A/D converter 16 and the memory control unit 22. In developing processing, development using calculation performed by the image processing unit 20 and the memory control unit 22 is performed. In recording processing, image data is read out from the memory 30, is compressed by the compression/decompression unit 32, and is written as image data to a recording medium 150 or 160.

An image display ON/OFF switch 66 can set ON/OFF of the image display unit 28. This function makes it possible to save electricity by cutting off current supply to the image display unit 28 constituted by a liquid crystal monitor or the like when performing shooting using the optical finder 104. A quick review ON/OFF switch 68 sets a quick review function for automatically reproducing shot image data immediately after shooting. An operation unit 70 is constituted by various buttons, a touch panel, and the like. The various buttons include a menu button, a flash setting button, a single shooting/continuous shooting/self-timer switching button, an exposure correction button, and the like.

A power source control unit 80 is constituted by a battery detection circuit, a DC/DC converter, a switch circuit for switching a block that is energized, and the like. Whether or not a battery is mounted, the type of battery, and battery remaining capacity are detected, and the DC/DC converter is controlled based on a detection result and an instruction of the system control unit 50, and a necessary voltage is supplied, for a necessary period, to constituent elements that include a recording medium. Connectors 82 and 84 connect, to the camera 100, a power source unit 86 constituted by a primary battery such as an alkaline battery or a lithium battery, a secondary battery such as a NiCd battery, a NiMH battery, or a lithium ion battery, an AC adapter, and the like.

Interfaces 90 and 94 have a function for connecting to a recording medium such as a memory card or a hard disk, and connectors 92 and 96 physically connect to a recording medium such as a memory card or a hard disk. A recording medium mounting/dismounting detection unit 98 detects whether or not a recording medium is mounted on the connector 92 or 96. Note that, in this embodiment, description is given in which two interfaces and two connectors for mounting a recording medium are provided, but a configuration may be adopted in which one or more interfaces and one or more connectors, or any number of interfaces and any number of connectors are provided. Also, a configuration may be adopted in which interfaces and connectors of different standards are provided in combination. Furthermore, it is possible to transfer image data and administrative information attached to image data to/from another peripheral device such as a computer or a printer by connecting various communication cards such as a LAN card to the interface and connector.

A communication unit 110 has various communication functions such as wired communication and wireless communication. A connector 112 connects the camera 100 to another device using the communication unit 110, and is an antenna in the case of wireless communication. The recording media 150 and 160 are memory cards, hard disks, or the like. The recording media 150 and 160 include recording units 152 and 162 constituted by a semiconductor memory, a magnetic disk, or the like, interfaces 154 and 164 to the camera 100, and connectors 156 and 166 for connecting to the camera 100.

Next, the taking lens 300 will be described. The taking lens 300 is mechanically and electrically connected to the camera 100 by engaging a lens mount 306 with the lens mount 106 of the camera 100. Electrical connection is realized by the connector 122 and a connector 322 respectively provided on the lens mount 106 and the lens mount 306. A lens 311 includes a focus lens for adjusting the focal distance of the taking lens 300. The focus control unit 342 performs focus adjustment of the taking lens 300 by driving the focus lens along the optical axis. The system control unit 50 controls operations of the focus control unit 342 through a lens system control unit 346. The diaphragm 312 adjusts the amount and angle of subject light that is incident to the camera 100.

The connector 322 and an interface 338 electrically connect the taking lens 300 to the connector 122 of the camera 100. The connector 322 has a function for transmitting control signals, state signals, data signals, and the like between the camera 100 and the taking lens 300, and also has a function for supplying currents of various voltages. The connector 322 may be configured to transmit such signals through not only electric communication but also optical communication, sound communication, and the like.

A zoom control unit 340 drives a variable magnification lens of the lens 311 so as to adjust the focal distance (field angle) of the taking lens 300. If the taking lens 300 is a single-focal lens, the zoom control unit 340 does not exist. The diaphragm control unit 344 controls the diaphragm 312 in cooperation with the shutter control unit 36 that controls the shutter 12 based on photometry information from the photometry unit 46.

The lens system control unit 346 has a programmable processor such as a CPU or an MPU, and controls overall operations of the taking lens 300 by executing a program stored in advance. Also, the lens system control unit 346 has a function of a memory that stores constants, variables, programs, and the like for operating the taking lens. A nonvolatile memory 348 stores identification information such as a number unique to a taking lens, administrative information, function information such as open aperture value, minimum aperture value, focal distance, present and past setting values, and the like.

In this embodiment, lens frame information that is based on the state of the taking lens 300 is also stored. This lens frame information includes information regarding the radius of a frame opening for defining a light beam that passes through the taking lens and information regarding the distance from the image sensor 14 to the frame opening. The diaphragm 312 is included in the frame that defines a light beam that passes through the taking lens, and, in addition, an opening of a lens frame part that holds a lens, or the like corresponds to the frame. In addition, the frame for defining a light beam that passes through the taking lens changes according to the focus position and zoom position of the lens 311, and thus a plurality of pieces of lens frame information are prepared in correspondence with focus positions and zoom positions of the lens 311. When the camera 100 performs focus detection using a focus detection means, optimum lens frame information corresponding to the focus position and zoom position of the lens 311 is selected, and is sent to the camera 100 through the connector 322.

The above is the configuration of the camera system of this embodiment constituted by the camera 100 and the taking lens 300.

Next, the configuration of the image sensor 14 will be described with reference to FIGS. 2A, 2B and 3.

Figure 2A:
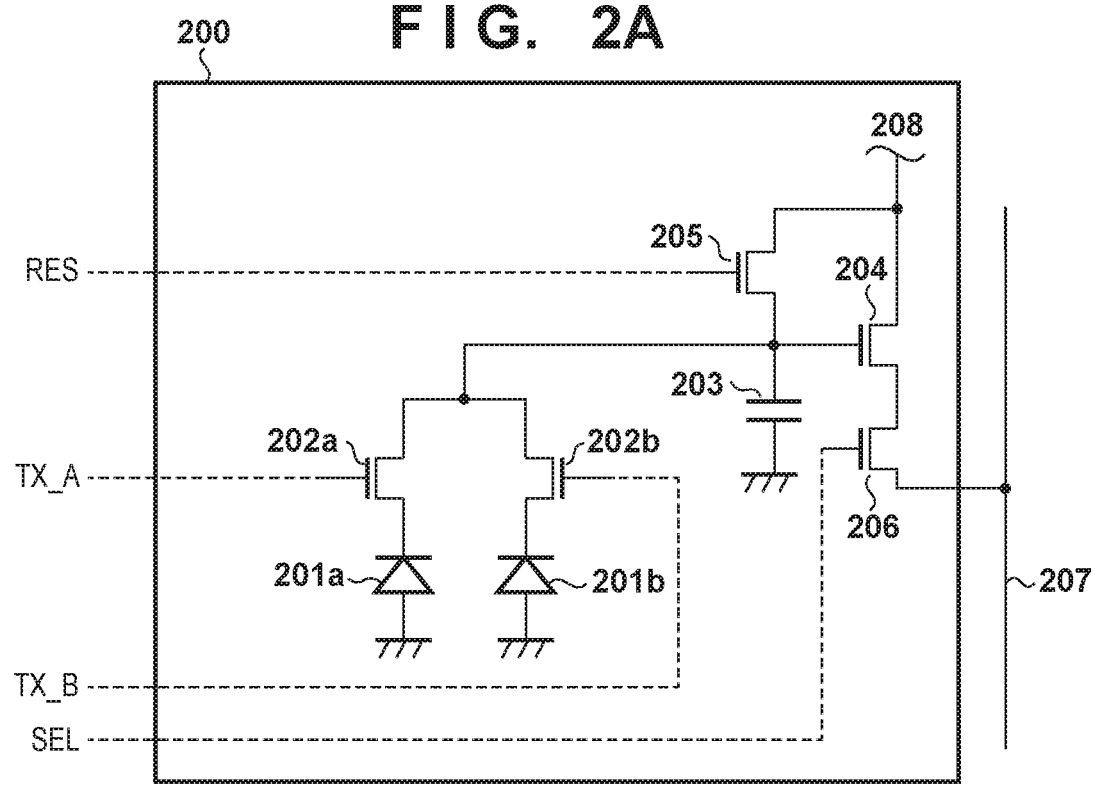
FIGS. 2A and 2B are diagrams showing a configuration example of an image sensor in an embodiment.

FIG. 2A is a diagram showing an example of a circuit configuration of a pixel that can output a signal to be used for focus detection of a phase difference detection method from among a plurality of pixels of the image sensor 14. Here, a configuration will be described in which two photodiodes PD201a and 201b are provided in one pixel 200 as a plurality of photoelectric conversion regions or photoelectric conversion portions that share one microlens. However, more (e.g., four) photodiodes may be provided for one microlens. In addition, the arrangement of photodiodes is not limited to the arrangement only in the horizontal direction, and the photodiodes may be arranged in the vertical direction. As will be described later, the photodiode 201a and the photodiode 201b function as focus detection pixels, and also function as imaging pixels.

Transfer switches 202a and 202b, a reset switch 205, and a selection switch 206 are each constituted by a MOS transistor, for example. In the following description, these switches are N-type MOS transistors, but may be P-type MOS transistors, or may be other switching elements.

Figure 2B:
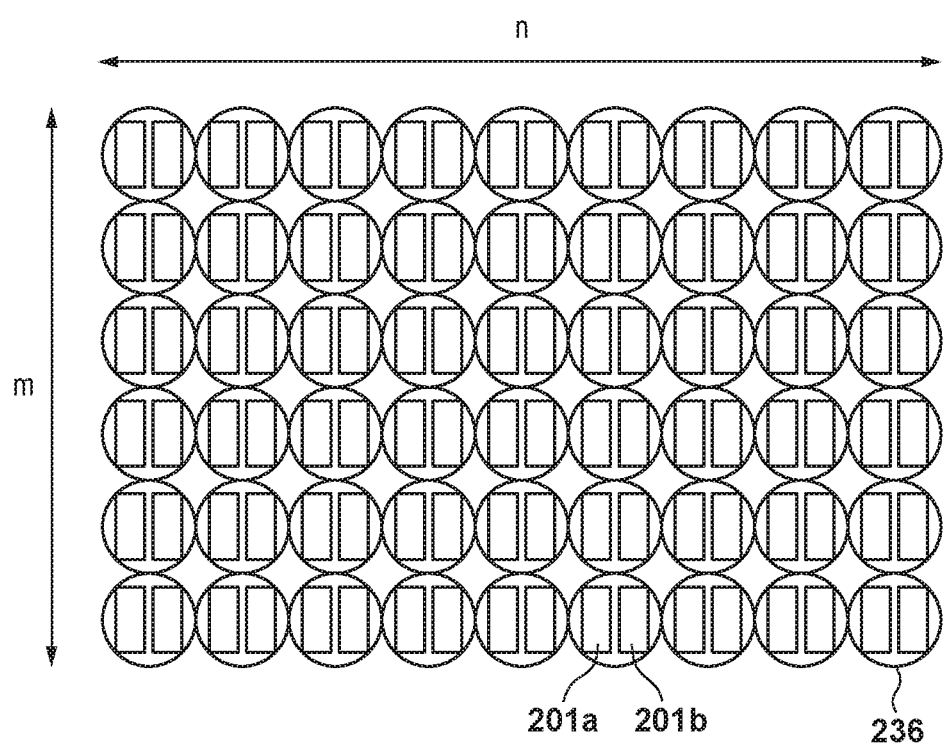

FIG. 2B is a diagram schematically showing n pixels in a horizontal direction and m pixels in a vertical direction from among a plurality of pixels arrayed two-dimensionally in the image sensor 14. Here, all of the pixels have the configuration shown in FIG. 2A. A microlens 236 is provided in each pixel, and the two photodiodes 201a and 201b are arranged for one microlens. Hereinafter, a signal that is obtained from the photodiode 201a is referred to as an A signal or a first signal, and a signal that is obtained from the photodiode 201b is referred to as a B signal or a second signal. In addition, a sequence of signals for focus detection that are generated from a plurality of A signals are referred to as an A image or first image signals, and a sequence of signals for focus detection that are generated from a plurality of B signals are referred to as a B image or second image signals. In addition, a pair of an A image and a B image are referred to as a pair of sequences of signals or a pair of image signals.

The transfer switch 202a is connected between the photodiode 201a and a floating diffusion portion (hereinafter, FD) 203. In addition, the transfer switch 202b is connected between the photodiode 201b and FD 203. The transfer switches 202a and 202b are elements for respectively transferring electric charges generated in the photodiodes 201a and 201b to common FD 203. The transfer switches 202a and 202b are respectively controlled using control signals TX_A and TX_B.

The floating diffusion portion (FD) 203 temporarily holds electric charges transferred from the photodiodes 201a and 201b, and functions as a charge/voltage conversion unit (capacitor) that converts held electric charges into a voltage signal.

An amplification unit 204 is a source follower MOS transistor. The gate of the amplification unit 204 is connected to FD 203, and the drain of the amplification unit 204 is connected to a common power source 208 that supplies a power source potential VDD. The amplification unit 204 amplifies the voltage signal that is based on electric charges held in FD 203, and outputs the signal as an image signal.

The reset switch 205 is connected between FD 203 and the common power source 208. The reset switch 205 is controlled by a control signal RES, and has a function for resetting the potential of FD 203 to the power source potential VDD of the common power source 208.

The selection switch 206 is connected between the source of the amplification unit 204 and a vertical output line 207. The selection switch 206 is controlled by a control signal SEL, and outputs an image signal amplified by the amplification unit 204 to the vertical output line 207.

Figure 3:
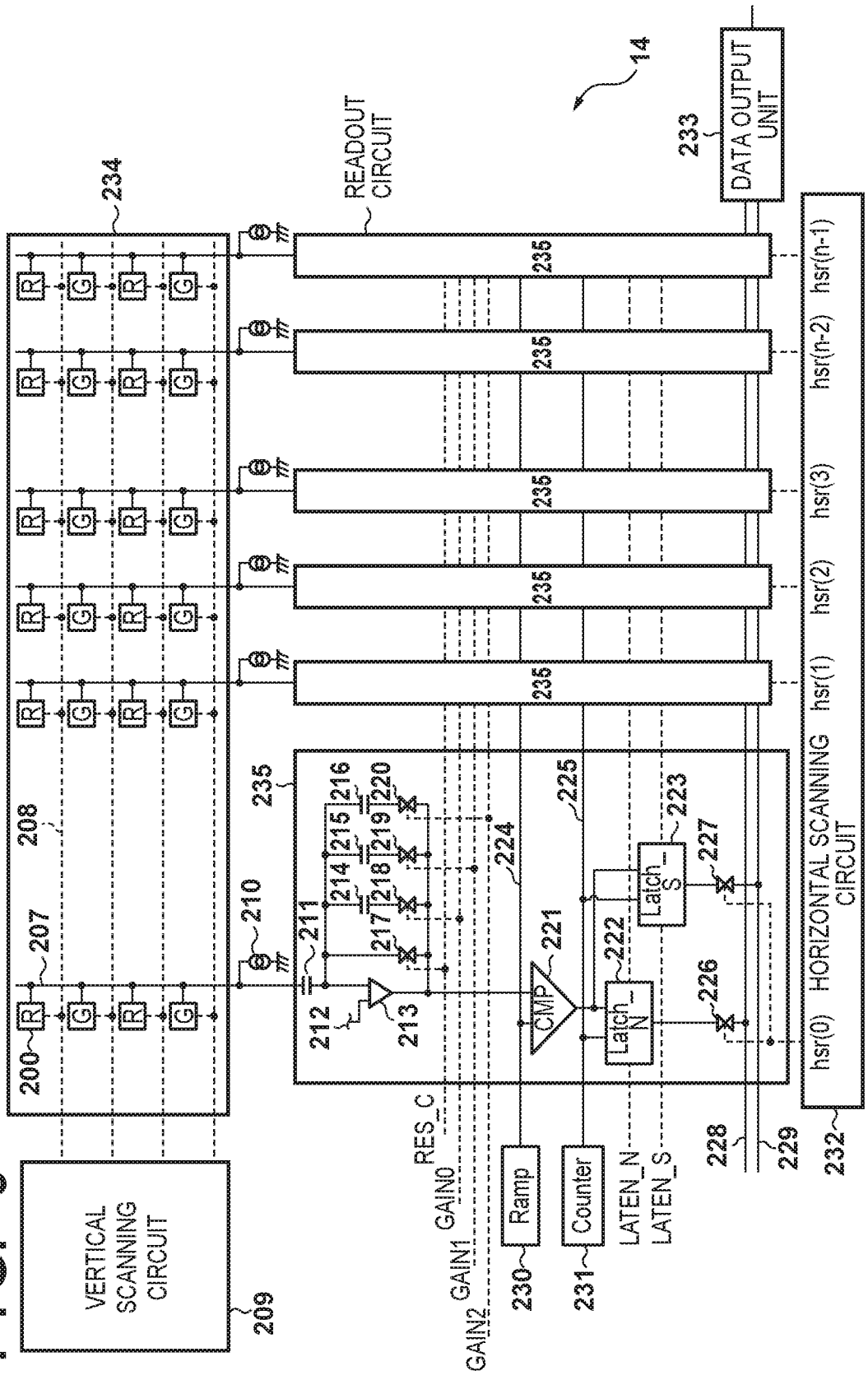
FIG. 3 is a diagram showing a configuration example of an image sensor in an embodiment.

FIG. 3 is a diagram showing a configuration example of the image sensor 14. The image sensor 14 has a pixel array 234, a vertical scanning circuit 209, current source loads 210, readout circuits 235, common output lines 228 and 229, a horizontal scanning circuit 232, and a data output unit 233. In the following description, all of the pixels included in the pixel array 234 have the circuit configuration shown in FIG. 2A. However, some pixels may have a configuration in which one photodiode is provided for one microlens.

The pixel array 234 has a plurality of pixels 200 arranged in a matrix. FIG. 3 shows the pixel array 234 having four rows and n columns for ease of description. However, the number of rows and the number of columns of the pixels 200 of the pixel array 234 may be appropriately set. In addition, in this embodiment, the image sensor 14 is a single-plate color image sensor, and has Bayer array primary color filters. Therefore, one of red (R), green (G) and blue (B) color filters is provided for each of the pixels 200. Note that color and arrangement configurations of the color filters are not limited particularly. In addition, some pixels included in the pixel array 234 are shielded from light so as to form an optical black (OB) region.

The vertical scanning circuit 209 supplies various control signals shown in FIG. 2A to the pixels 200 in each of the rows via the drive signal line 208 provided for the row. Note that, in FIG. 3, for ease of description, the drive signal line 208 in each row is indicated by a line, but, in actuality, there are a plurality of drive signal lines in each row.

The pixels included in the pixel array 234 are connected, for each column, to the vertical output line 207 shared by the pixels in the column. The current source load 210 is connected to each vertical output line 207. Signals from the pixels 200 are input to the readout circuits 235 provided for the respective columns, through the vertical output lines 207.

The horizontal scanning circuit 232 outputs control signals hsr(0) to hsr(n−1) respectively corresponding to the readout circuits 235. One of n readout circuits 235 is selected using a control signal hsr( ). The readout circuit 235 selected using the control signal hsr( ) outputs a signal to the data output unit 233 through the common output lines 228 and 229.

Next, an example of a specific circuit configuration of the readout circuit 235 will be described. FIG. 3 shows an example of the circuit configuration of one of the n readout circuits 235, but the other readout circuits 235 have the same configuration. The readout circuit 235 of this embodiment includes a ramp A/D converter.

A signal that has been input to the readout circuit 235 through the vertical output line 207 is input to an inverting input terminal of an operational amplifier 213 via a clamp capacitor 211. A reference voltage Vref is supplied from a reference voltage source 212 to a non-inverting input terminal of the operational amplifier 213. Feedback capacitors 214 to 216 and switches 218 to 220 are connected between the inverting input terminal and output terminal of the operational amplifier 213. A switch 217 is further connected between the inverting input terminal and output terminal of the operational amplifier 213. The switch 217 is controlled by a control signal RES_C, and has a function for causing the two ends of each of the feedback capacitors 214 to 216 to short-circuit. In addition, the switches 218 to 220 are controlled using control signals GAIN0 to GAIN2 by the system control unit 50.

An output signal of the operational amplifier 213 and a ramp signal 224 that is output from a ramp signal generator 230 are input to a comparator 221. Latch_N222 is a storage element for holding a noise level (N signal), and Latch_S is a storage element for holding a signal level (A signal) and a signal level (A+B signal) acquired by adding an A signal and a B signal. Output of the comparator 221 (a value indicating a comparison result) and output 225 of a counter 231 (a counter value) are respectively input to Latch_N222 and Latch_S223. Operations of Latch_N222 and Latch_S223 (whether Latch_N222 and Latch_S223 are enabled or disabled) are respectively controlled by control signals LATEN_N and LATEN_S. A noise level held in Latch_N222 is output to the common output line 228 via a switch 226. A signal level held in Latch_S223 is output to the common output line 229 via a switch 227. The common output lines 228 and 229 are connected to the data output unit 233.

The switches 226 and 227 are controlled by a control signal hsr(h) from the horizontal scanning circuit 232. Here, h indicates the column number of the readout circuit 235 to which the control signal line is connected. Signal levels held in Latch_N222 and Latch_S223 of each of the readout circuits 235 are sequentially output to common output lines 238 and 229, and are output to the memory control unit 22 and the image processing unit 20 through the data output unit 233. This operation for sequentially outputting signal levels held in the readout circuits 235 to the outside is called horizontal transferring. Note that control signals (except for hsr( )) that are input to the readout circuits and control signals of the vertical scanning circuit 209, the horizontal scanning circuit 232, the ramp signal generator 230, and the counter 231 are supplied from the timing generation circuit 18 and the system control unit 50.

Figure 4:
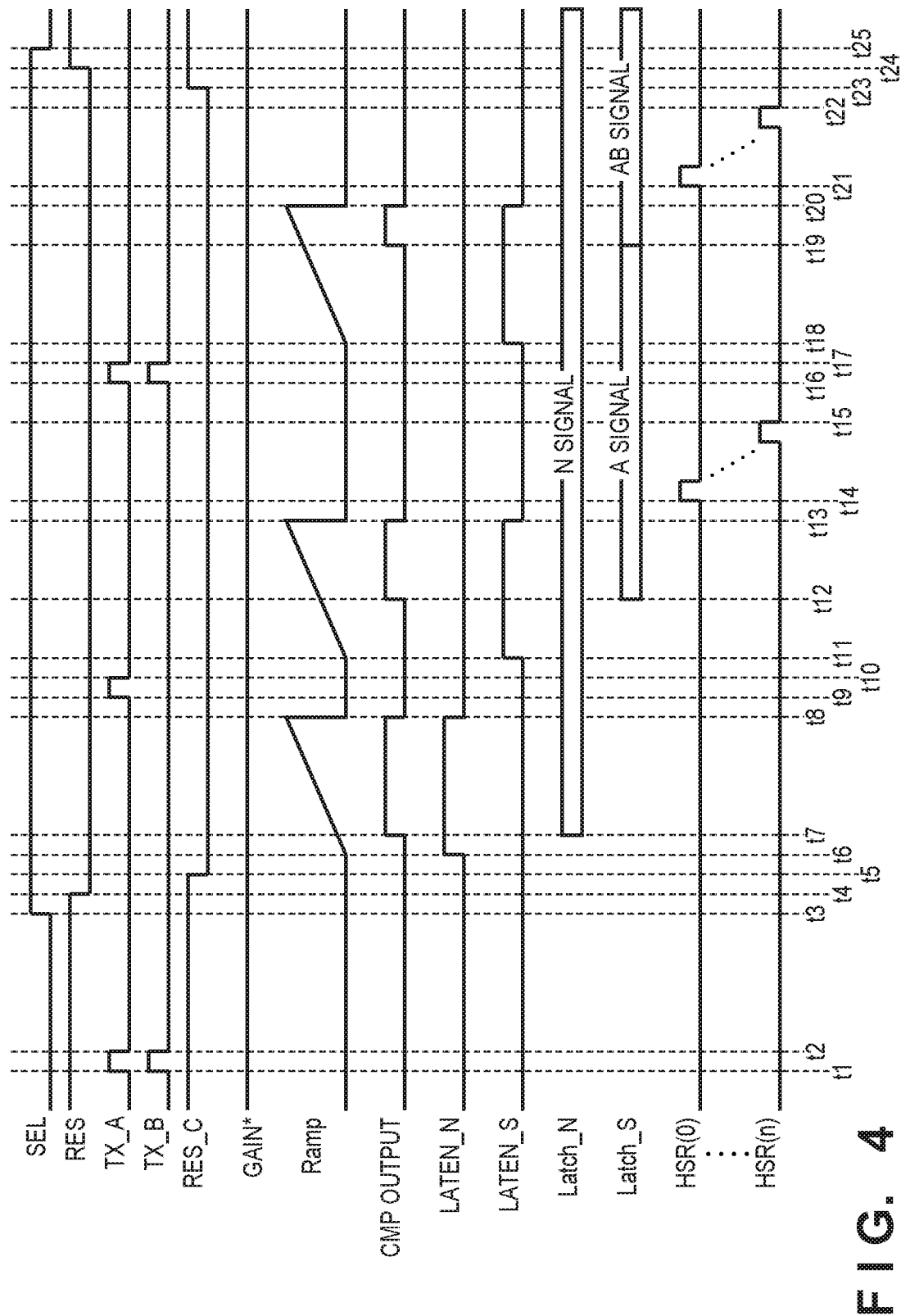
FIG. 4 is a timing chart showing an exemplary operation of the image sensor in FIG. 3.

A readout operation for pixels of one row will be described with reference to FIG. 4 that is a timing chart related to a readout operation of the image sensor 14 shown in FIG. 3. Note that, when a control signal is at H, the switch is on, and when a control signal is at L, the switch is off.

At a time t1, the vertical scanning circuit 209 changes the control signals TX_A and TX_B from L to H in the state where the control signal RES is set to H, and turns on the transfer switches 202a and 202b. Accordingly, electric charges accumulated in the photodiodes 201a and 201b are transferred to the power source 208 via the transfer switches 202a and 202b and the reset switch 205, and the photodiodes 201a and 201b are reset. Also, FD 203 is reset similarly. At a time t2, when the vertical scanning circuit 209 changes the control signals TX_A and TX_B to L, and turns off the transfer switches 202a and 202b, accumulation of photocharges in the photodiodes 201a and 201b is started.

When a predetermined accumulation time has elapsed, the vertical scanning circuit 209 changes the control signal SEL to H at a time t3, and turns on the selection switch 206. Accordingly, the source of the amplification unit 204 is connected to the vertical output line 207. At a time t4, the vertical scanning circuit 209 changes the control signal RES to L, and turns off the reset switch 205. Accordingly, reset of FD 203 is cancelled, and the reset signal level of FD 203 is read out to the vertical output line 207 via the amplification unit 204, and is input to the readout circuit 235.

After that, at a time t5, the timing generation circuit 18 changes the control signal RES_C to L. Accordingly, the switch 217 is turned on, and a voltage that is based on the difference between the reset signal level that has been read out to the vertical output line 207 and the reference voltage Vref is output from the operational amplifier 213. The image sensor 14 is set in advance, based on an ISO sensitivity that has been set using the operation unit 70, such that the system control unit 50 changes one of the control signals GAIN0 to GAIN2 to H. For example, if one of ISO sensitivities 100, 200, and 400 can be set in the camera 100 of an embodiment, in the case of the ISO sensitivity 100, the control signal GAIN0 is at H, and the control signals GAIN1 and GAIN2 are at L. Similarly, in the case of the ISO sensitivity 200, the control signal GAIN1 is at H, and in the case of the ISO sensitivity 400, the control signal GAIN2 is at H. Note that a type of setting sensitivity and a relationship between setting sensitivities and control signals are not limited thereto.

The operational amplifier 213 amplifies a voltage that has been input, with an inverted gain that is determined according to the capacity ratio of the clamp capacitor 211 to one of the feedback capacitors 214 to 216 corresponding to a switch corresponding to a control signal that is at H from among the control signals GAIN0 to GAIN2, and outputs the amplified voltage. In this amplification, random noise components that occur in circuits before the operational amplifier 213 are also amplified. Therefore, the magnitude of random noise included in a signal after amplification depends on the ISO sensitivity.

Next, at a time t6, the ramp signal generator 230 starts outputting a ramp signal whose signal level increases linearly over time, and at the same time, the counter 231 starts counting-up from a reset state. In addition, the timing generation circuit 18 changes LATEN_N to H, and enables Latch_N. The comparator 221 compares an output signal of the operational amplifier 213 and the ramp signal that is output from the ramp signal generator 230. When a ramp signal level exceeds the output signal level of the operational amplifier 213, output of the comparator 221 changes from L to H (time t7). When the output of the comparator 221 changes from L to H in the state where LATEN_N is at H, Latch_N222 stores a counter value that is being output by the counter 231 at this point. The counter value stored in Latch_N222 is equivalent to a digital value (N signal data) indicating an N signal level. Note that LATEN_S is at L, and thus Latch_S223 is disabled, and does not store the count value. After that, at a time t8, when the ramp signal level reaches a predetermined value, the ramp signal generator 230 stops outputting the ramp signal, and the timing generation circuit changes LATEN_N to L.

At a time t9, the vertical scanning circuit 209 changes the control signal TX_A to H. Accordingly, the transfer switch 202a is turned on, and photocharges (A signals) accumulated in the photodiode 201a since the time t2 are transferred to FD 203. After that, at a time t10, the vertical scanning circuit 209 changes the control signal TX_A to L. FD 203 converts the transferred electric charges into a potential, and this potential (A signal level) is output to the readout circuit 235 via the amplification unit 204 and the vertical output line 207. The operational amplifier 213 outputs a voltage that is based on the difference between the A signal level that has been read out to the vertical output line 207 and the reference voltage Vref. An inverted gain of the operational amplifier 213 is determined according to the rate of the clamp capacitor 211 to one of the feedback capacitors 214 to 216.

Next, at a time t11, the ramp signal generator 230 starts outputting a ramp signal, and at the same time, the counter 231 starts counting-up from a reset state. In addition, the timing generation circuit 18 changes LATEN_S to H, and enables Latch_S. The comparator 221 compares an output signal of the operational amplifier 213 with the ramp signal that is output by the ramp signal generator 230. When the ramp signal level exceeds the output signal level of the operational amplifier 213, output of the comparator 221 changes from L to H (at a time t12). When output of the comparator 221 changes from L to H in the state were LATEN_S is at H, Latch_S223 stores the counter value that is being output by the counter 231 at this point. The counter value stored in Latch_S223 is equivalent to a digital value (A signal data) indicating the A signal level. Note that LATEN_N is at L, and thus Latch_N222 is disabled, and does not store the count value. After that, at a time t13, when the ramp signal level reaches a predetermined value, the ramp signal generator 230 stops outputting the ramp signal, and the timing generation circuit changes LATEN_S to L.

After that, during a period from a time t14 to a time t15, the horizontal scanning circuit 232 sequentially changes the control signal hsr(h) to H for a certain period. Accordingly, the switches 226 and 227 of each of the readout circuits 235 are turned on for a certain period, and are then returned to off. N signal data and A signal data held in Latch_N222 and Latch_S223 of each of the readout circuits 235 are respectively read out to the common output lines 228 and 229, and are input to the data output unit 233. Regarding the A signal data and N signal data that have been output from each of the readout circuits 235, the data output unit 233 outputs a value acquired by subtracting the N signal data from the A signal data to the outside.

During a period from a time t16 to a time t17, the vertical scanning circuit 209 changes the control signals TX_A and TX_B to H, and turns on the transfer switches 202a and 202b. Accordingly, photocharges are transferred from both the photodiodes 201a and 201b to FD 203. FD 203 converts the transferred electric charges into a potential, and this potential (A+B signal level) is output to the readout circuit 235 via the amplification unit 204 and the vertical output line 207. The operational amplifier 213 outputs a voltage that is based on the difference between the A+B signal level that has been read out to the vertical output line 207 and the reference voltage Vref.

Next, at a time t18, the ramp signal generator 230 starts outputting a ramp signal, and, at the same time, the counter 231 starts counting-up from a reset state. In addition, the timing generation circuit 18 changes LATEN_S to H, and enables Latch_S. The comparator 221 compares an output signal of the operational amplifier 213 and the ramp signal that is output by the ramp signal generator 230. When the ramp signal level exceeds the output signal level of the operational amplifier 213, output of the comparator 221 changes from L to H (at a time t19). When output of the comparator 221 changes from L to H in the state where LATEN_S is at H, Latch_S223 stores a counter value that is being output by the counter 231 at this point. The counter value stored in Latch_S223 is equivalent to a digital value (A+B signal data) indicating an A+B signal level. After that, at a time t20, when the ramp signal level reaches a predetermined value, the ramp signal generator 230 stops outputting the ramp signal, and the timing generation circuit changes LATEN_S back to L.

After that, during a period from a time t21 to a time t22, the horizontal scanning circuit 232 sequentially changes the control signal hsr(h) to H for a certain period. Accordingly, the switches 226 and 227 of each of the readout circuits 235 are turned on for a certain period, and are then returned to off. The N signal data and A+B signal data held in Latch_N222 and Latch_S223 of each of the readout circuits 235 are respectively read out to the common output lines 228 and 229, and are input to the data output unit 233. Regarding the A+B signal data and N signal data that have been output from each of the readout circuits 235, the data output unit 233 outputs a value acquired by subtracting the N signal data from the A+B signal data to the outside.

When the timing generation circuit 18 changes the control signal RES_C to H at the time t22, the vertical scanning circuit 209 changes the control signal RES to H at a time t23, and the vertical scanning circuit 209 changes the control signal SEL to L at a time t24, a readout operation for one row is complete. By repeating this operation for a predetermined number of rows, image signals for one screen can be acquired.

In this manner, it is possible to read out A signals and A+B signals from which reset noise has been removed, from the image sensor 14. A signals are used as signals for focus detection, and A+B signals are used as signals for forming a captured image. A+B signals and A signals are also used for generating B signals for focus detection.

Note that the image sensor 14 of this embodiment has two types of readout modes, namely an all-pixel readout mode and a thinned readout mode. The all-pixel readout mode is a mode for reading out all of the effective pixels, and, for example, is set when obtaining a high-definition still image.

The thinned readout mode is a mode for reading out a smaller number of pixels than the all-pixel readout mode, and is set in the case of obtaining an image whose resolution is lower than that of a high-definition still image, such as a moving image and an image for preview, and in the case where it is necessary to perform readout at a high speed. For example, it is possible to thin pixels at the same ratio or different ratios in the horizontal and vertical directions of an image, and read out the thinned pixels. Note that "thinning" includes not only a configuration for not performing readout itself, but also a configuration for discarding (ignoring) signals that have been read out, and a configuration for adding a plurality of signals that have been read out and generating one signal. For example, by averaging signals that have been read out from a plurality of adjacent pixels and generating one signal, S/N can be improved.

Figure 5A:
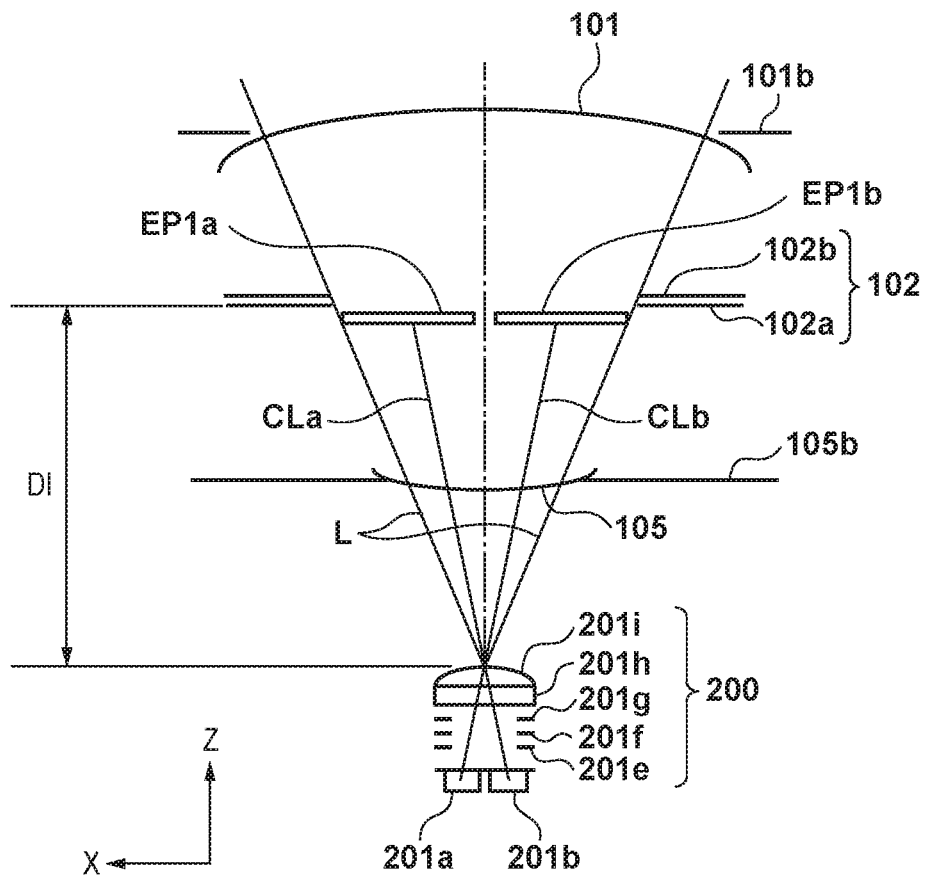
FIG. 5A is a diagram showing the relationship between photoelectric conversion regions and an exit pupil in an embodiment.

FIG. 5A is a diagram for describing the conjugate relationship between the exit pupil plane of the taking lens 300 and the photodiodes 201a and 201b of a pixel 200 (central pixel) arranged in the vicinity of the center of the imaging plane of the image sensor 14, in the image capturing apparatus of this embodiment. The photodiodes 201a and 201b in the image sensor 14 and the exit pupil plane of the taking lens 300 are designed so as to have a conjugate relationship using an on-chip microlens 201i. In addition, generally, the exit pupil plane of the taking lens 300 substantially matches a plane on which an iris diaphragm for adjusting the light amount is provided.

On the other hand, the taking lens 300 of this embodiment is a zoom lens that has a magnification changing function. In some zoom lenses, the size of the exit pupil and the distance (exit pupil distance) from the imaging plane to the exit pupil change when a magnification changing operation is performed. FIG. 5A shows the state where the focal distance of the taking lens 300 is at the center between the wide angle end and the telephoto-end. Using an exit pupil distance D1 in this state as a standard value, the shape of the on-chip microlens and an eccentric parameter that is based on the image height (the distance from the center of the screen or XY coordinates) are optimally designed.

In FIG. 5A, the taking lens 300 has a first lens group 101, a barrel member 101b that holds the first lens group, a third lens group 105, and a barrel member 105b that holds the third lens group. The taking lens 300 also has a diaphragm 102, an opening plate 102a that defines the opening diameter when the diaphragm is opened, and a diaphragm blade 102b for adjusting the opening diameter when stopping down the lens. Note that, in FIG. 5A, 101b, 102a, 102b, and 105b that act as members for restricting a light beam that passes through the taking lens 300 denote optical virtual images when observed from the imaging plane. In addition, a synthetic aperture in the vicinity of the diaphragm 102 is defined as an exit pupil of the taking lens 300, and the distance from the imaging plane to the exit pupil is defined as the exit pupil distance D1.

The photodiodes (photoelectric conversion portions) 201a and 201b are arranged in the lowermost layer of the pixel 200. Interconnect layers 201e to 201g, a color filter 201h, and the on-chip microlens 201i are provided above the photodiodes 201a and 201b. The photodiodes 201a and 201b are projected on the exit pupil plane of the taking lens 300 by the on-chip microlens 201i. In other words, the exit pupil is projected on the surfaces of the photodiodes 201a and 201b via the on-chip microlens 201i.

Figure 5B:
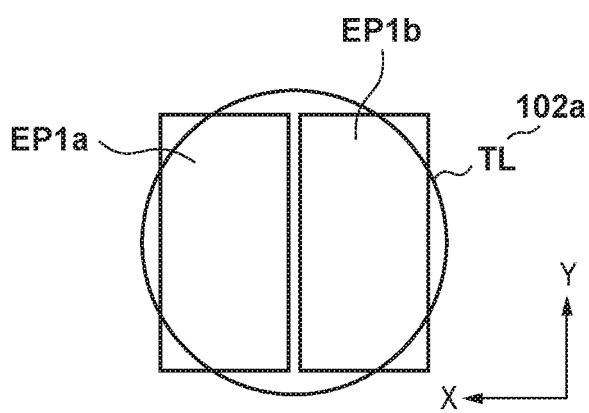
FIG. 5B is a diagram showing the relationship between photoelectric conversion regions and an exit pupil in an embodiment.

FIG. 5B shows projected images EP1a and EP1b of the photodiodes 201a and 201b on the exit pupil plane of the taking lens 300. A circle TL indicates the maximum incident range of a light beam that is incident to the pixel 200, on the exit pupil plane, the maximum incident range being defined by the opening plate 102a of the diaphragm 102. The circle TL is defined by the opening plate 102a, and thus, in the drawings, the circle TL is also indicated by reference numeral 102a. FIG. 5B shows a central pixel, and the vignetting of a light beam is symmetrical relative to the optical axis, and the photodiodes 201a and 201b receive a light beam passing through pupil regions of the same size. The circle TL includes a large portion of the projected images EP1a and EP1b, and thus there is substantially no vignetting of the light beam. Therefore, in the case where signals that have been photoelectrically converted by the photodiodes 201a and 201b are added, a result of photoelectrically converting a light beam passing through the circle TL, in other words, substantially the entirety of the exit pupil region is obtained. A region of the exit pupil from which a light beam is received by the photodiode 201a is referred to as a first pupil region, a region of the exit pupil from which a light beam is received by the photodiode 201b is referred to as a second pupil region, and a region acquired by adding the first pupil region and the second pupil region is referred to as a third pupil region.

Crosstalk that occurs between pixels will be described with reference to the structure of the pixel 200 shown in FIGS. 5A and 5B. Crosstalk between adjacent pixels is classified into two categories according to its causes. One is optical crosstalk that occurs due to arrangement of the on-chip microlens 201i, the color filter 201h, and the interconnect layers 201e to 201g, and stray light caused by reflection, scattering, and the like of transmission light, for example. The other is electric crosstalk that occurs due to movement of electric charges generated in a photoelectric conversion portion of each pixel to another pixel.

Regarding optical crosstalk, the amount of crosstalk (the amount of light that traveled to adjacent pixels) that occurs due to difference in transmittance, reflectivity, refractive index, and the like according to the wavelength of light also differs for each color. In addition, the amount of crosstalk that occurs also differs according to the incident angle of light. Furthermore, due to the anisotropy of the interconnect layers 201e to 201g of a pixel, anisotropy occurs also in a direction in which crosstalk occurs.

Similarly, also regarding electric crosstalk, depths at which crosstalk invades photodiodes differ according to the wavelengths (depths at which photoelectrical conversion is performed), and thus the amount of crosstalk (the amount of electric charges that travel to adjacent pixels) that occurs also differs for each color. In addition, anisotropy occurs in a direction in which electric crosstalk occurs, due to the anisotropy of the interconnect layers 201e to 201g of the pixel and the height of a barrier against signal charges between pixels in addition to the wavelength. The height of a barrier against signal charges between pixels is described in Japanese Patent Laid-Open No. 2014-187067 in detail.

The pixels of the image sensor of this embodiment are described assuming that crosstalk has anisotropy, and the crosstalk amount is larger in the horizontal direction than in the vertical direction. For example, such a situation is achieved in the case where the height of a barrier between pixels and the state of the interconnect layers are configured such that crosstalk is less likely to occur in the vertical direction than in the horizontal direction.

In the case where the amount of crosstalk that occurs depends on the wavelength and incident angle, or includes anisotropy as described above, a focus detection error occurs. In this embodiment, a method that can realize accurate focus detection even if crosstalk occurs is proposed. Detailed description will be given later.

Figure 6:
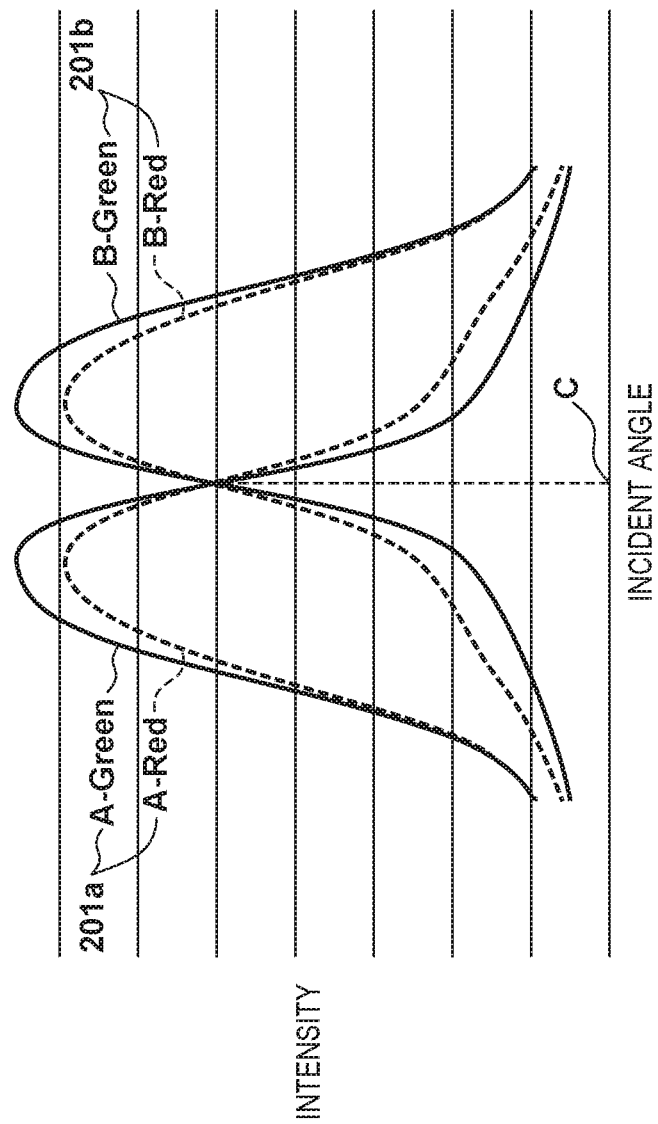
FIG. 6 is a diagram showing the property of light receiving sensitivity distribution of a photoelectric conversion portion with respect to an incident angle in an embodiment.

Next, the property of light receiving sensitivity distribution of the photodiodes 201a and 201b with respect to the incident angle of light for each wavelength will be described with reference to FIG. 6. FIG. 6 is a diagram showing the signal intensity distribution of the photodiodes 201a and 201b of two pixels 200 with respect to the incident angle, and the two pixels 200 are arranged in the vicinity of the center of the imaging plane of the image sensor 14, and have red (R) and green (G) color filters. The horizontal axis indicates incident angle, and positive incident angles are on the right. The vertical axis indicates signal intensity equivalent to the light receiving sensitivity, and the incident angle at an intersection C of the signal intensity between the photodiodes 201a and 201b is the origin. The intensity distribution of the photodiode 201a takes the maximum value of intensity in the case where the incident angle is negative, and the intensity distribution of the photodiode 201b takes the maximum value of intensity in the case where the incident angle is positive. Due to difference in refractive index according to the wavelength, the shapes of properties of light receiving sensitivities of R and G with respect to the incident angle differ. Note that color filters arranged on the pixels of the image sensor 14 include blue (B) color filters, which are omitted here for ease of description. Note that, also in the case of blue, the intensity distribution shape is different from those of red and green due to dependency on wavelength.

As being apparent from FIG. 6, at an incident angle C corresponding to the intersection of the property curve, signal intensity ratios between R and G are equal in the photodiodes 201a and 201b. On the other hand, a change rate of signal intensity for the incident angle differs between R and G, and thus, in a region separated from the incident angle C, the signal intensity ratios between R and G differ between the photodiodes 201a and 201b. For example, in the case where the incident angle is negative, in the photodiode 201a, the signal intensity of R is smaller than the signal intensity of G. On the other hand, in the photodiode 201b, the signal intensity of R is larger than the signal intensity of G. In this case, the signal intensity ratios between R and G differ between a pair of signals that are used for focus detection.

A case where signal intensity ratio differs according to each wavelength will be described with reference to FIGS. 7A to 7C. FIGS. 7A to 7C are diagrams showing the relationship between a first pupil region 501 corresponding to the photodiode 201a, a second pupil region 502 corresponding to the photodiode 201b, and the third pupil region 400 that is the exit pupil of the taking lens 300, at a peripheral image height of the image sensor 14. The horizontal direction of the third pupil region 400 is referred to as an X axial direction, and the vertical direction is referred to as a Y axial direction.

FIG. 7A is a diagram showing the case where the exit pupil distance D1 of the taking lens 300 and a set pupil distance Ds of the image sensor 14 are the same. In this case, the exit pupil 400 of the taking lens 300 is divided roughly equally by the first pupil region 501 and the second pupil region 502. Taking light receiving sensitivity distribution with respect to the incident angle into consideration, an incident angle θ at which light is incident at each image height is substantially the same as an incident angle θc at which sensitivity is the highest in pixels having the photodiodes 201a and 201b (θ=θc). In other words, in the light receiving sensitivity distribution with respect to the incident angle shown in FIG. 6, in the case where the incident angle θc is set as an origin, signal intensity ratios of RGB between a pair of signals that are used for focus detection become substantially the same at any image height as a result of receiving a light beam of a region symmetrical relative to the vertical axis.

FIG. 7B is a diagram showing the case where the exit pupil distance D1 of the taking lens 300 is shorter than the set pupil distance Ds of the image sensor 14. In addition, FIG. 7C is a diagram showing the case where the exit pupil distance D1 of the taking lens 300 is longer than the set pupil distance Ds of the image sensor 14. In both cases, at a peripheral image height of the image sensor 14, the exit pupil 400 of the taking lens 300 and the first and second pupil regions deviate, and the exit pupil 400 of the taking lens 300 is unequally divided. Considering the light receiving sensitivity distribution with respect to the incident angle, the higher the image height is, the more the light incident angle θ in FIGS. 7B and 7C deviates from the incident angle θc at which the sensitivity of pixels having the photodiodes 201a and 201b is the highest. Therefore, as the deviation between the exit pupil distance D1 of the taking lens 300 and the set pupil distance Ds is larger, and the image height is higher, in the light receiving sensitivity distribution with respect to the incident angle shown in FIG. 6, the photodiodes 201a and 201b will receive a light beam at an incident angle more separated from the origin. Accordingly, the difference in intensity of RGB signals between a pair of signals that are used for focus detection becomes larger. On the other hand, at the central image height of the image sensor 14, regardless of the relationship between the exit pupil distance D1 of the taking lens 300 and the set pupil distance Ds of the image sensor 14, pupil deviation does not occur. Therefore, the pupil is equally divided, and a difference in intensity of RGB signals between a pair of signals that are used for focus detection does not occur. In this embodiment, as described above, in the case where the focal distance of the taking lens 300 reaches the wide angle end or the telephoto-end, the states in FIGS. 7B and 7C can be achieved. In addition, the same applies to the case where the taking lens is replaced, and the like.

Figure 8:
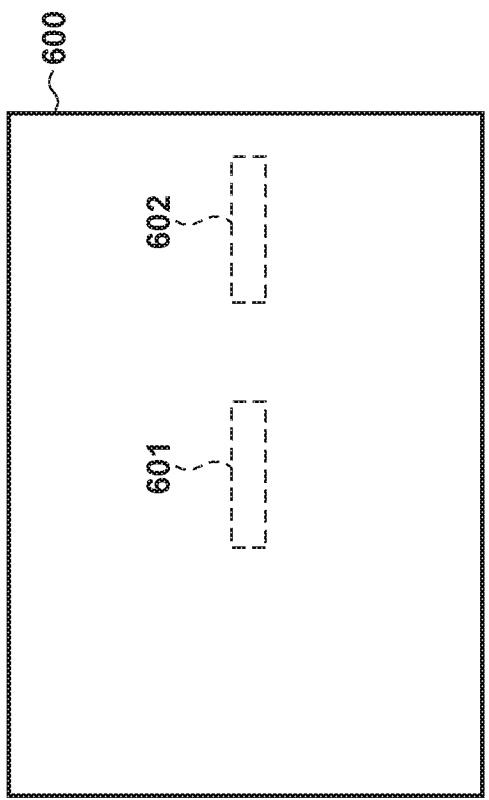
FIG. 8 is a diagram showing an example of a shooting range and focus detection regions in an embodiment.

FIG. 8 is a diagram showing an example of focus detection regions 601 and 602 that are set in a shooting range 600. The focus detection region 601 is a focus detection region whose center is set at a so-called central image height that matches the intersection between the optical axis of the taking lens 300 and the image sensor 14. On the other hand, the focus detection region 602 is a focus detection region whose center is set at a so-called peripheral image height that is separated from the intersection between the optical axis of the taking lens 300 and the image sensor 14. In the case of performing focus detection using output of pixels of the image sensor 14, both in a contrast detection method and a phase difference detection method, output of pixels included in regions in the image sensor 14 corresponding to the focus detection regions 601 and 602 are used. Accordingly, it can also be said that the focus detection regions 601 and 602 are set in the image sensor 14. Therefore, the focus detection regions 601 and 602 will be described as pixel regions of the image sensor 14 below for ease of description. In addition, the pixels 200 having the configuration shown in FIG. 2A are arranged in four rows and 2N columns in the focus detection regions 601 and 602. Note that this is merely exemplary, and the number and size of focus detection regions (the number of pixels included therein) can be determined as appropriate in a range in which phase difference detection is not disturbed. In addition, not only regions long in the horizontal direction but also regions long in the vertical direction may be used as focus detection regions.

Figure 9:
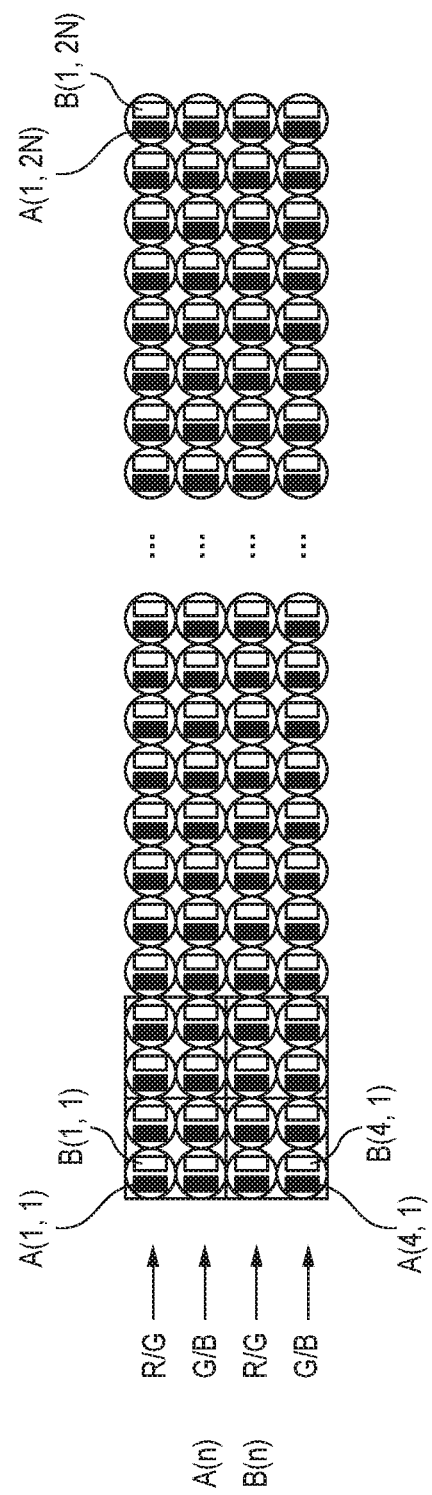
FIG. 9 is a diagram showing pixels arranged within a focus detection region in an embodiment.

FIG. 9 shows pixels in four rows and 2N columns arranged in the focus detection regions 601 and 602. In this embodiment, the photodiode 201a and output of the photodiode 201a used for obtaining a signal of an A image for AF in an i-th row and a j-th column are indicated by A (i, j). Similarly, the photodiode 201b and output of the photodiode 201b used for obtaining a signal of a B image for AF in the i-th row and the j-th column are indicated by B (i, j). In FIG. 9, pixels having red (R) color filters and pixels having green (Gr) color filters are alternately arranged in the first and third rows, and pixels having green (Gb) color filters and pixels having blue (B) color filters are alternately arranged in the second and fourth rows. In this embodiment, green pixels arranged next to red (R) pixels in the right-left direction are expressed as Gr pixels, and green pixels arranged next to blue (B) pixels in the right-left direction are expressed as Gb pixels, in order to distinguish the green pixels.

Figure 10A:
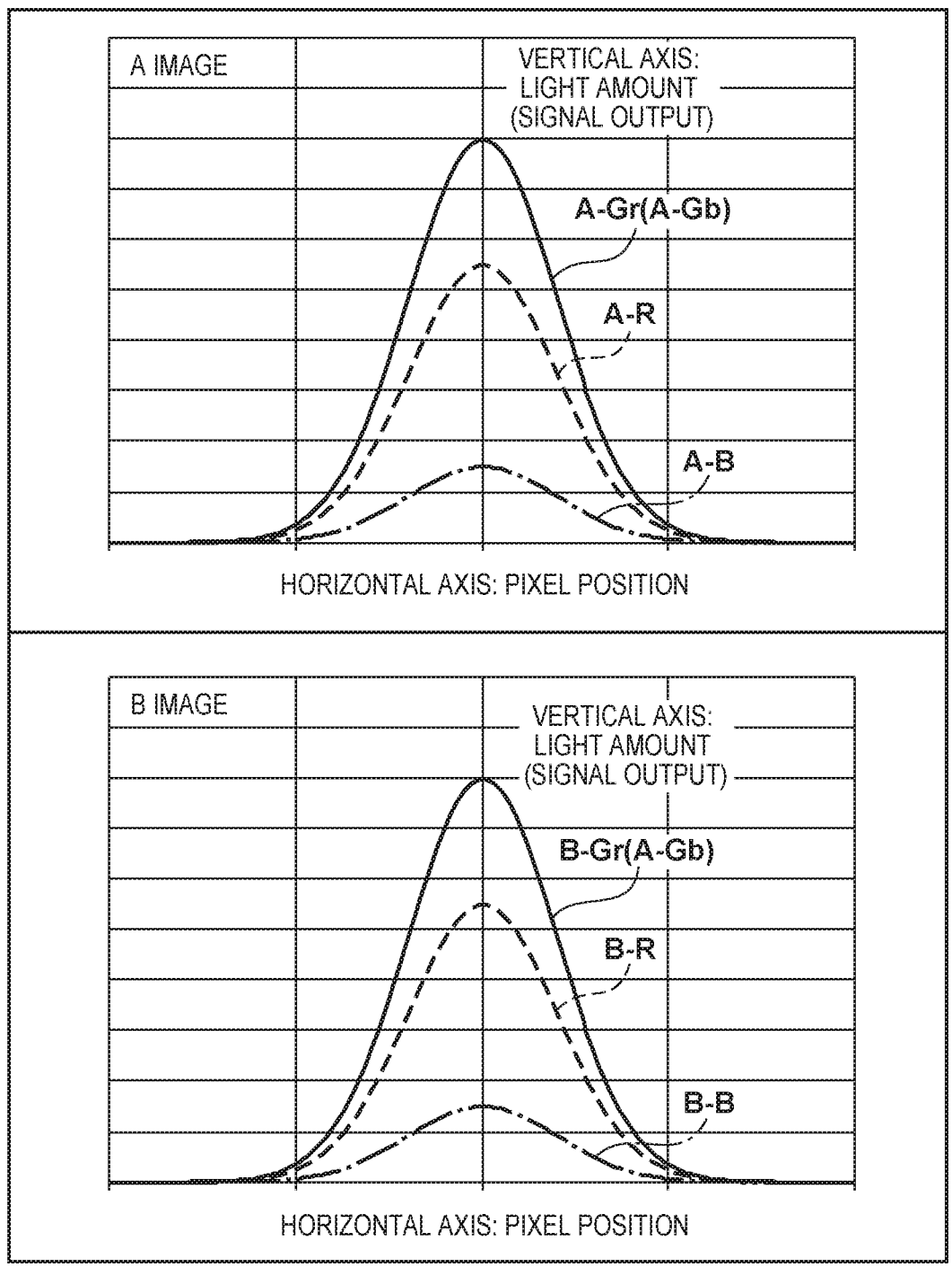
FIG. 10A is a diagram showing line spread function of pixel outputs for each color filter in an embodiment.

FIG. 10A is a diagram showing, separately for each arrangement of color filters, an example of intensity distribution of signals obtained from pixels arranged in the focus detection region 601. The horizontal axis indicates pixel number, and the vertical axis indicates signal intensity corresponding to light amount. Two vertically adjacent graphs are shown such that the relative positional relationship between an A image and a B image is easily understood. The upper graph indicates an A image, and the lower graph indicates a B image.

In the two graphs in FIG. 10A, a red (R) signal is indicated by a long-broken line, a green (Gr) signal is indicated by a short-broken line, a green (Gb) signal is indicated by a solid line, and a blue (B) signal is indicated by an alternate long and short dash line. Note that substantially the same outputs are obtained from the two green signals (Gr and Gb), and thus are shown as being overlapped on each other. On the other hand, deviation of the heights of the peaks of the red and blue signals from those of green signals is mainly caused by the difference in the spectral characteristics of the subject.

In addition, FIG. 10A shows a state where, due to being nearly in focus, image deviation does not occur between the A image and the B image, and the centroids match. As described with reference to FIGS. 7A to 7C, the focus detection region 601 is at the central image height, and thus the degree of vignetting due to the taking lens 300 and the like are substantially the same, and the difference of signals between the A image and the B image is small.

Figure 10B:
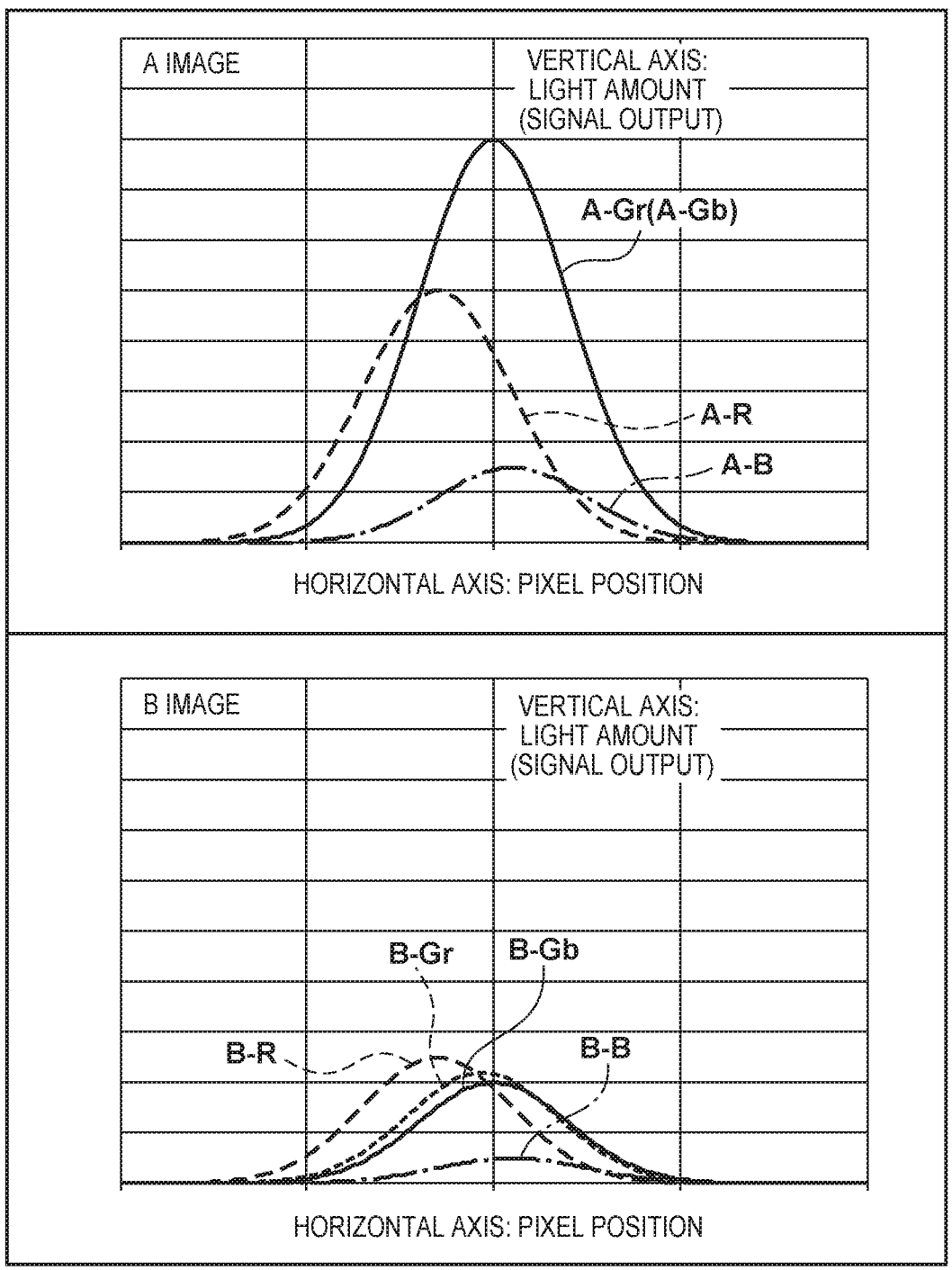
FIG. 10B is a diagram showing line spread function of pixel output for each color filter in an embodiment.

FIG. 10B is a diagram showing, separately for each arrangement of color filters, an example of intensity distribution of signals that are obtained from pixels arranged in the focus detection region 602. The horizontal axis indicates pixel number, and the vertical axis indicates signal intensity corresponding to light amount. The two vertically adjacent graphs are shown such that the relative positional relationship between an A image and a B image is easily understood. The upper graph indicates an A image, and the lower graph indicates a B image.

In the two graphs in FIG. 10B, a red (R) signal is indicated by a long-broken line, a green (Gr) signal is indicated by a short-broken line, a green (Gb) signal is indicated by a solid line, and a blue (B) signal is indicated by an alternate long and short dash line. Note that, in the A image (the upper graph), substantially the same outputs are obtained from the two green signals (Gr and Gb), and thus are shown as being overlapped on each other. On the other hand, deviation of the heights of the peaks of the red and blue signals from that of green signals is mainly caused by the difference in the spectral characteristics of the subject. In the graph of the A image, the pixel positions of the centroids of the red and blue signals are further deviated. This indicates that line images are formed at different positions according to colors due to the magnification chromatic aberration of the taking lens 300.

The B image (the lower graph) in FIG. 10B indicates that outputs different both in height of peak and pixel position of the centroid are obtained from the two green signals (Gr and Gb). The cause of signal outputs of Gr and Gb having different shapes despite the green signals having the same spectral characteristics will be described later. On the other hand, deviation of the heights of the peaks of the red and blue signals from that of the green signals is mainly caused by difference in the spectral characteristics of the subject. In the graph of the B image, the positions of the red and blue signal in the horizontal axial direction are further deviated. This indicates that line images are formed at different positions according to colors due to magnification chromatic aberration of the taking lens 300.

In addition, in FIG. 10B, regarding any colors, an output of a signal of the B image is smaller than an output of a signal of the A image. This indicates that asymmetrical vignetting has occurred in a light beam of the A image and the B image passing through the taking lens 300. As described with reference to FIG. 7B, due to difference in light receiving sensitivity distribution with respect to the incident angle of the A image signals and the B image signals corresponding to the incident angle of a shooting light beam, output of signals of the B image is smaller than output of signals of the A image.

Furthermore, in FIG. 10B, intensity ratios, with respect to colors (RGB), of the A image and the B image differ. The peaks of the signals of the A image is smaller in the order of G, R, and B, while the peaks of the signals of the B image is smaller in the order of R, G, and B. This indicates that the sensitivity distribution of a light beam that is incident to pixels at a peripheral image height for each color differs between the A image and B image. The intensity ratios of the A image and B image with respect to the colors (RGB) differ due to difference of RGB ratios of light receiving sensitivity distribution corresponding to the incident angle of the A image signal and B image signal, as described with reference to FIG. 7B.

Next, the cause of the difference of the shapes of outputs of the two green signals (Gr and Gb) of the B image in FIG. 10B will be described with reference to FIGS. 11A and 11B. In this embodiment, difference in output between Gr and Gb of the B image is caused by the influence of the signal intensity ratios of the A image and B image, the magnification chromatic aberration of the taking lens 300, anisotropy of crosstalk between the pixels, and the like. Detailed description will be given below.

Figure 11A:
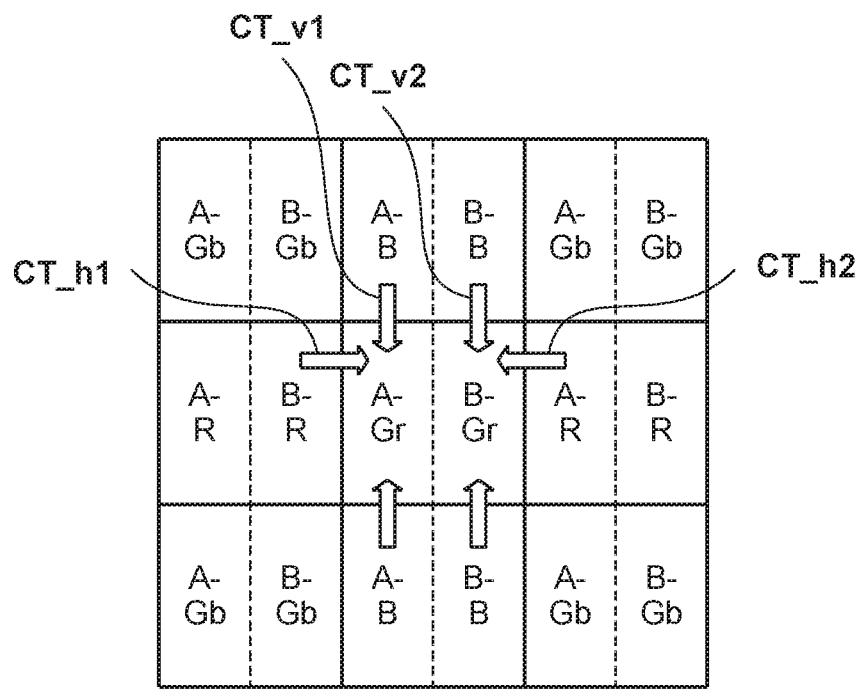
FIGS. 11A and 11B are diagrams for describing crosstalk between pixels in an embodiment.

FIG. 11A is a diagram showing paths along which crosstalk travels to Gr pixels. FIG. 11B is a diagram showing paths along which crosstalk travels to Gb pixels. It is essentially necessary to consider crosstalk between pixels bi-directionally, but the amount of crosstalk that invades Gr and Gb pixels will be described below focused on the difference between Gr and Gb. In addition, crosstalk between an A image and a B image within the same pixel acts so as to cancel the image deviation amount, and causes a focus detection error after all. However, the light amount ratios of the A image and B image are substantially the same regarding both Gr and Gb pixels, and thus the ratio of crosstalk amount is also the same, which does not cause a difference between Gr and Gb of the B image. Therefore, a description thereof is omitted.

First, Gr and Gb of an A image will be described with reference to FIGS. 11A and 11B. Gr of the A image receives crosstalk (CT_h1) from R of the B image on the left. Note that the light amount of R of the B image is smaller than Gr of the A image as shown in FIG. 10B, and thus output change due to crosstalk is small. Furthermore, Gr of the A image receives crosstalk (CT_v1) of B of the A image from above and below. Note that the light amount of B of the A image is smaller than that of Gr of the A image as shown in FIG. 10B, and thus output change due to crosstalk is small. Accordingly, Gr of the A image is hardly affected by crosstalk under the condition as shown in FIG. 10B.

Figure 11B:
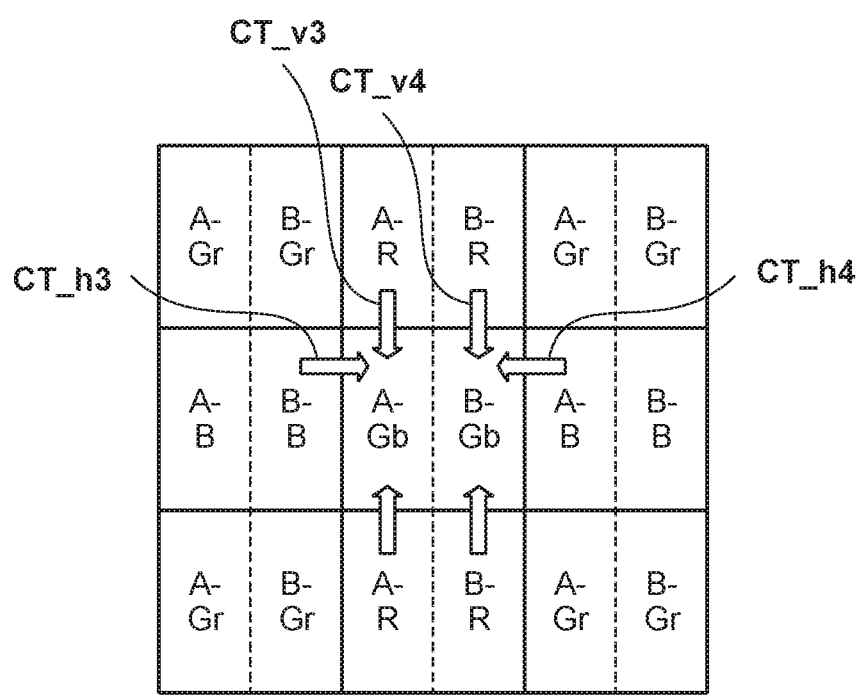

Gb of the A image receives crosstalk (CT_h3) from B of the B image on the left as shown in FIG. 11B. Note that the light amount of B of the B image is smaller than Gb of the A image as shown in FIG. 10B, and thus output change due to crosstalk is small. Furthermore, Gb of the A image receives crosstalk (CT_v3) from R of the A image from above and below. The light amount of R of the A image is relatively larger than that of Gb of the A image as shown in FIG. 10B. Note that, in the pixels of the image sensor 14 of this embodiment, the amounts of crosstalk that occurs in the horizontal and vertical directions are different, and the crosstalk amount in the vertical direction is smaller. Therefore. Gb of the A image is hardly affected by crosstalk under the condition as shown in FIG. 10B. As a result, Gr and Gb of the A image do not differ largely.

Next, Gr and Gb of the B image will be described with reference to FIGS. 11A and 11B. Gr of the B image receives crosstalk (CT_h2) from R of the A image on the right. The light amount of R of the A image is larger than that of Gr of the B image as shown in FIG. 10B, and output change due to crosstalk is large. Therefore, output of Gr of the B image changes due to crosstalk at the pixel position (the horizontal axis) of R of the A image in FIG. 10B. Furthermore, Gr of the B image receives crosstalk (CT_v2) of B of the B image from above and below. Note that the light amount of B of the B image is smaller than that of Gr of the B image as shown in FIG. 10B, and thus output change due to crosstalk is small. Additionally, under the condition as shown in FIG. 10B, Gr of the B image is mainly affected by R of the A image, and the position of the centroid changes due to output change.

As shown in FIG. 11B, Gb of the B image receives crosstalk (CT_h4) from B of the A image on the right. Note that, as shown in FIG. 10B, the light amount of B of the A image is smaller than that of Gb of the B image, and thus output change due to crosstalk is small. Furthermore, Gb of the B image receives crosstalk (CT_v4) of R of the B image from above and below. The light amount of R of the B image is relatively larger than that of Gb of the B image as shown in FIG. 10B. Note that, in the pixels of the image sensor 14 of this embodiment, amounts of crosstalk that occurs in the horizontal and vertical directions are different, and the amount of crosstalk that occurs in vertical direction is smaller. Therefore, Gb of the B image is hardly affected by crosstalk under the condition as shown in FIG. 10B. As a result, regarding Gr and Gb of the B image, output of Gr of the B image is larger than that of Gb mainly due to crosstalk from R of the A image, and the position of the centroid changes and deviates to the left in FIG. 10B.

Due to such effect of crosstalk, despite being not defocused, the position of the centroid of the line spread function of Gr of the B image is deviated to the left in FIG. 10B relative to Gb of the B image. Focus detection is equivalent to calculation of an image deviation amount (centroid interval) between the A image and the B image, and thus a centroid position error of Gr is a focus detection error. In view of this, in this embodiment, by performing weighting for each color when performing combining of signals, a signal that can cause a focus detection error is excluded, and accurate focus detection is realized.

A signal combining method will be described in detail later, but the overview thereof will be described here.

As described above, the effect of crosstalk is large in the case where the crosstalk amount is large and the signal amount of pixels that received crosstalk is small. CT_h2/B-Gr that is a ratio of the amount of crosstalk (CT_h2) that leaked from R pixels of the A image into Gr pixels of the B image as shown in FIG. 11A to the signals of Gr pixels of the B image (B-Gr) is referred to as a first ratio. In addition, CT_h4/B-Gb that is a ratio of the amount of crosstalk (CT_h4) that leaked from B pixels of the A image to Gb pixels of the B image as shown in FIG. 11B to the signals of Gb pixels of the B image (B-Gb) is referred to as a second ratio. The larger each of these ratios is, the larger the change in position of the centroid of pixels corresponding to the denominator of the ratio is, due to output change caused by crosstalk. In the case where the first ratio is larger than the second ratio, the effect of crosstalk is larger in Gr pixels of the B image than in Gb pixels of the B image. The position of the centroid of Gb pixels of the B image is closer to the essential position of the centroid without crosstalk. Therefore, in this embodiment, focus detection calculation is performed with a larger weighting for signals of Gb pixels of the B image than signals of Gr pixels of the B image. Accordingly, it is possible to reduce a change in the position of the centroid caused by crosstalk, and accurately calculate an image deviation amount (centroid interval) between the A image and the B image. Note that, in this embodiment, description was given focused on Gr pixels and Gb pixels of the B image, but the same applies to other different pixels. Note that signal (B-Gr), signal (B-Gb), and the like are respectively output by photodiodes (photoelectric conversion portions) of Gr, photodiodes (photoelectric conversion portions) of Gb, and the like, but these photodiodes hereinafter referred to as "pixels" for convenience of description.

As seen from the above description, the followings are conceivable as causes of different outputs being obtained from pixels Gr and Gb from which the same outputs are essentially obtained:
spectral characteristics of a subject (RGB ratio):
angle dependence and spectral dependence of sensitivity distribution of a pair of photodiodes with respect to the incident angle:
the taking lens and the image height of the focus detection region;
magnification chromatic aberration that occurs in the taking lens; and
crosstalk amount between pixels (for each direction in which crosstalk travels from adjacent pixels).

Different outputs are obtained from Gr and Gb pixels due to these factors, and thus it is difficult to obtain the degree of contribution of each factor, and obtain the degree of influence of a detection error for an obtained focus detection result for each factor. In addition, the spectral characteristics of the subject also contributes to the difference, and thus it is also difficult for the image capturing apparatus to store crosstalk amounts and focus detection errors as correction values in advance.

In view of this, in this embodiment, the reliability of a focus detection result is determined using the difference in output between Gr and Gb that occurs as a result. Accordingly, even in the case where a crosstalk amount different from a design value and a focus detection error occur due to a manufacturing error and the like, it is possible to perform accurate reliability determination. A reliability determination method will be described later in detail, but, in this embodiment, reliability determination to be described later is performed using Gb of the B image that receives light whose spectrum is substantially the same as Gr of the B image that receives green light.

Focus Detection Operation

Figure 12:
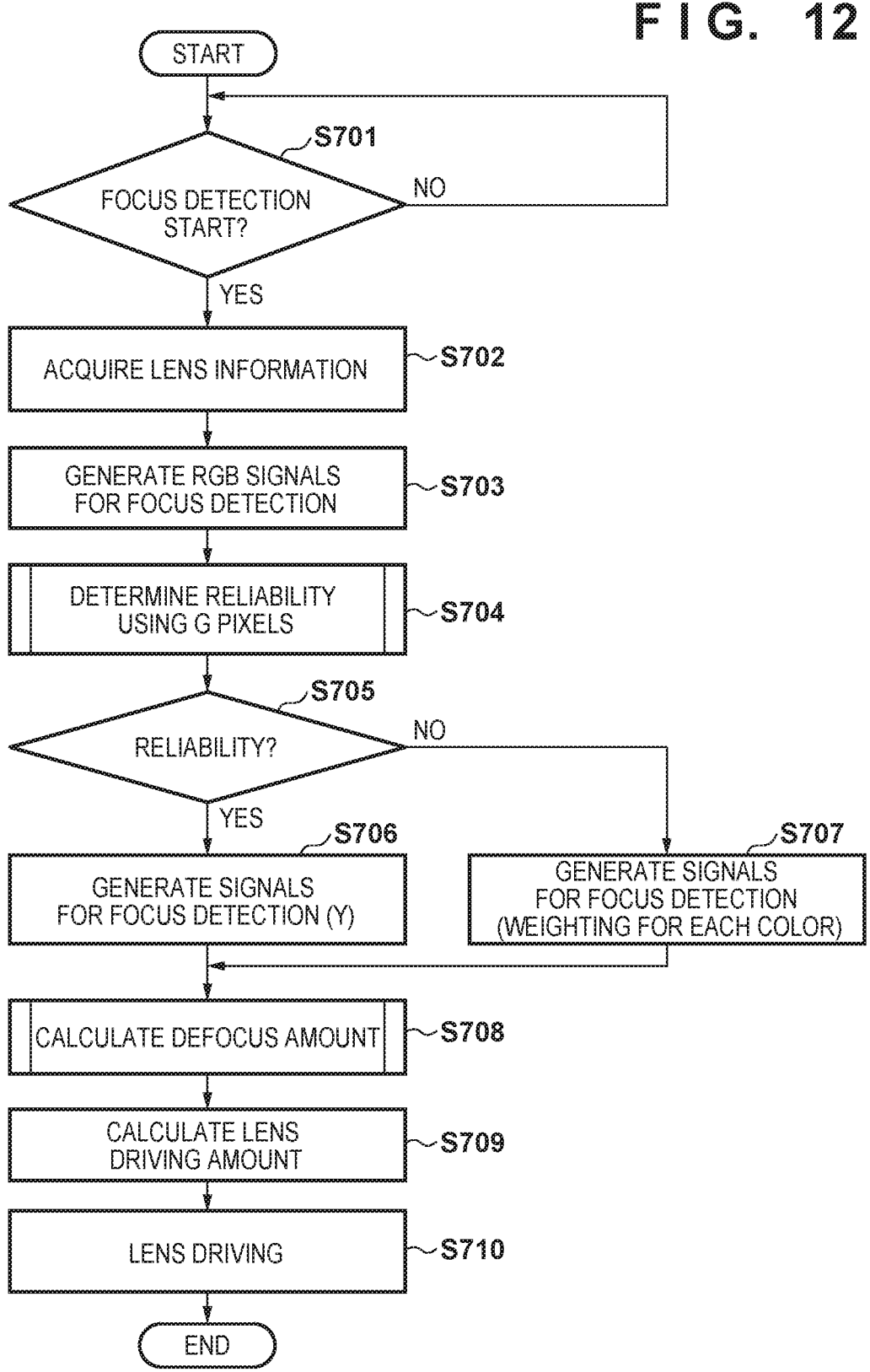
FIG. 12 is a flowchart showing a focus adjustment operation in an embodiment.

Next, a focus adjustment operation of the camera 100 will be described with reference to a flowchart shown in FIG. 12. Note that processing shown in FIG. 12 is carried out in the state where the main mirror 130 and the sub mirror 131 retreated to the outside of the light path (mirror lock-up), more specifically, during live view display (when shooting a moving image to be displayed) or during recording of a moving image (when shooting a moving image to be recorded). Note that, here, description is given in which automatic focus detection of a phase difference detection method is performed using output of the image sensor 14, but, as described above, automatic focus detection of a contrast detection method can also be performed.

In step S701, the system control unit 50 determines, based on an operation performed on the switch SW1 (62), the operation unit 70, or the like, whether or not a focus detection start instruction has been input, and in the case where it is determined that a focus detection start instruction has been input, advances the procedure to step S702, and in the case where it is not determined that a focus detection start instruction has been input, waits. Note that the system control unit 50 may advance the procedure to step S702 using start of live view display or moving image recording as a trigger, regardless of input of a focus detection start instruction.

In step S702, the system control unit 50 acquires lens frame information of the taking lens 300 and various pieces of lens information such as a focus lens position from the lens system control unit 346 via the interface units 38 and 338 and the connectors 122 and 322.

In step S703, the system control unit 50 instructs the image processing unit 20 to connect signals of photoelectric conversion portions in the pupil divided direction, the signals having been obtained from pixel data in a focus detection region of frame image data that is being sequentially read out, and generate pairs of image signals for AF. The image processing unit 20 generates pairs of image signals for AF, and supplies the generated pairs of image signals for AF to the AF unit 42. The AF unit 42 performs processing for correcting the difference in signal level and the like on the pairs of image signals for AF. Also, the AF unit 42 detects a peak value (maximum value) and a bottom value (minimum value) of the image signals for AF. The image processing unit 20 performs processing for each type of the color filters (R, Gr, Gb, and B) of pixels, and generates pairs of image signals, as pairs of image signals for AF.

In step S704, the AF unit 42 performs reliability determination processing using Gr and Gb signals of an A image or a B image. As described above, reliability in the case where crosstalk that occurred due to various reasons affects focus detection is determined using a fact that the same signal wave forms are obtained from the Gr and Gb signals of the A image or the B image in the case where there is no crosstalk. This processing will be described later in detail. The AF unit 42 outputs the reliability determination result to the system control unit 50.

In step S705, the system control unit 50 determines the reliability of focus detection signals based on the reliability determination result obtained from the AF unit 42 in step S704. In the case where it is determined that the reliability is high, the procedure advances to step S706, and the image processing unit 20 processes pairs of image signals for AF configured according to each type of the color filters (R, Gr, Gb, and B) of pixels into Y signals (luminance signals) that do not change by color, by performing filter processing and combing processing. Accordingly, it is possible to reduce the information amount of the pairs of image signals for AF, and reduce the calculation amount in subsequent processing. In this embodiment, pixels in four rows and 2N columns are arranged in the focus detection regions 601 and 602, but, for example, two pixels are combined in each of the horizontal and vertical directions, and the pixels are compressed into signals in two rows and N columns.

On the other hand, in the case where it is determined in step S705 that the reliability of the focus detection signals is low, the procedure advances to step S707. By performing filter processing and combining processing after performing weighting processing for each color, the image processing unit 20 processes pairs of image signals for AF configured according to each type of the color filters (R, Gr, Gb, and B) of pixels into signals (combined signals) that do not change by color. For example, in the configuration of this embodiment, Gr of the B image is likely to be affected by crosstalk, and thus it is conceivable that weighting is performed such that the ratio of Gr signals to focus detection signals is decreased, and signals for each type of the color filters (R, Gr, Gb, and B) are combined. Weighting includes generation of focus detection signals without using Gr (setting weight of Gr to zero). In this embodiment, pixels in four rows and 2N columns are arranged in the focus detection regions 601 and 602, but the pixels are compressed into signals in two rows and N columns similar to step S705 while performing weighting for each color.

Weighting for each color changes according to the following pieces of information:
light receiving sensitivity distribution for the absolute value difference between the exit pupil distance of a taking lens and the set pupil distance of an image sensor, and the incident angle of the image sensor;
magnification chromatic aberration of a taking lens;
spectral characteristics of a subject (RGB ratio); and
structure of an image sensor (whether or not there is a light shielding wall, the structure between pixels or the structure of interconnect layers, and the like).

The above-described pieces of information will be described individually below.

Light Receiving Sensitivity Distribution for Absolute Value Difference Between Exit Pupil Distance of Imaging Optical System and Set Pupil Distance of Image Sensor, and Incident Angle of Image Sensor As described with reference to FIGS. 7A to 7C, as the absolute value of the difference between the exit pupil distance of the taking lens 300 and the set pupil distance of the image sensor 14 is larger, and the image height is higher, the photodiodes 201a and 201b receive a light beam at an incident angle separated from the origin, in the light receiving sensitivity distribution with respect to the incident angle shown in FIG. 6. Therefore, the difference in RGB signal intensity in pairs of signals that are used for focus detection is large. Accordingly, different outputs are likely to be generated from the above-described Gr and Gb pixels. Therefore, it is possible to reduce the effect of the crosstalk amount, and reduce focus detection errors, by increasing weighting of pixels (e.g., Gb) in which the degree of the effect of crosstalk is small as the absolute value difference between the exit pupil distance of a taking lens and the set pupil distance of an image sensor is larger, or the image height is higher.

Magnification Chromatic Aberration of Imaging Optical System

As described with reference to FIGS. 10A and 10B, if the pixel position of the centroid of red (R), green (G), and blue (B) signals is deviated due to the magnification chromatic aberration of the taking lens 300, line images are formed at positions different according to colors. Therefore, for example, it is preferable that the camera 100 or the taking lens 300 holds information regarding the centroid difference between R and G and the centroid difference between B and G as the magnification chromatic aberration information of the taking lens 300, and weighting for each color is changed according to the amount of centroid difference of line images between R and G and the amount of centroid difference of line images between B and G. For example, in the case where the signal amount of G is large, the centroid difference between R and G is large, and the centroid difference between B and G is large, it is possible to reduce the crosstalk amount, and reduce focus detection errors by increasing weighting of Gr and B.

Spectral Characteristics of Subject (RGB Ratio)

The degree of the effect of crosstalk differs according to the spectral characteristics of a subject. For example, in the case of a subject having only green spectral characteristics, Gr (Gb) pixels receive the largest amount of subject light, and signal intensity of the other pixels receive crosstalk from Gr (Gb), and thus it is preferable that the other pixels are not used for signals for focus detection. By changing weighting for each color according to the intensity at which subject light is received based on the spectral characteristics of the subject in this manner, it is possible to reduce the crosstalk amount, and reduce focus detection errors. Regarding the spectral characteristics of the subject, the RGB ratio of a focus detection region is calculated by the image processing unit 20 in advance, and according to the calculation result, weighting of signals for focus detection for each color is performed. In addition, weighting may be changed according to of the brightness of the subject.

Structure of Image Sensor

As described above, anisotropy of interconnect layers of a pixel and the height of barriers against signal charges between pixels differ according to the pixel pitch and the pixel structure of the image sensor. The amount of crosstalk that occurs differs due to these structures, and thus in the case of a structure according to which crosstalk is likely to occur (e.g., barriers against signal charges between pixels are low), weighting for each of the colors (R, Gr, Gb, and B) is performed (weight of pixels in which the effect of crosstalk is small is increased). In addition, in the case of a structure according to which crosstalk is unlikely to occur (e.g., barriers against signal charges between pixels are large), weighting for each color is reduced. These make it possible to reduce focus detection errors.

In addition, weighting is not limited to Gr and Gb, and may be performed on other colors in addition to Gr and Gb. It suffices that weighting is performed on red (R) and blue (B) outputs according to the amount of magnification chromatic aberration and the like, which have been described above. For example, in the case where deviation of the image forming position between R and G is large due to magnification chromatic aberration, it is sufficient that, in step S707 in FIG. 12, weighting of red is made small in the processing performed in step S706.

Returning to FIG. 12, in step S708, the AF unit 42 calculates a correlation amount COR (k) of the A image and the B image, and detects the deviation amount k at which the correlation amount COR (k) is minimized, as the deviation amount (phase difference) of the image. Furthermore, the AF unit 42 converts the detected deviation amount into a defocus amount. Detailed description of this processing will be given later. The AF unit 42 outputs the defocus amount to the system control unit 50.

In step S709, the system control unit 50 determines a focus lens driving amount and driving direction of the taking lens 300 based on the defocus amount obtained from the AF unit 42 in step S708.

In step S710, the system control unit 50 transmits information regarding the driving amount and the driving direction of the focus lens to the lens system control unit 346 of the taking lens 300 via the interface units 38 and 338 and the connectors 122 and 322. The lens system control unit 346 transmits the information regarding the driving amount and the driving direction of the focus lens to the focus control unit 342. The focus control unit 342 drives the focus lens based on the received information regarding the lens driving amount and driving direction. Accordingly, focus adjustment of the taking lens 300 is performed. Note that the operation in FIG. 12 may be continuously carried out also when moving image data of the next frame onward is read out. The information regarding the driving amount and the driving direction of the focus lens may be directly transmitted from the system control unit 50 to the focus control unit 342.

Subroutine of Reliability Determination Using G Pixels

Figure 13:
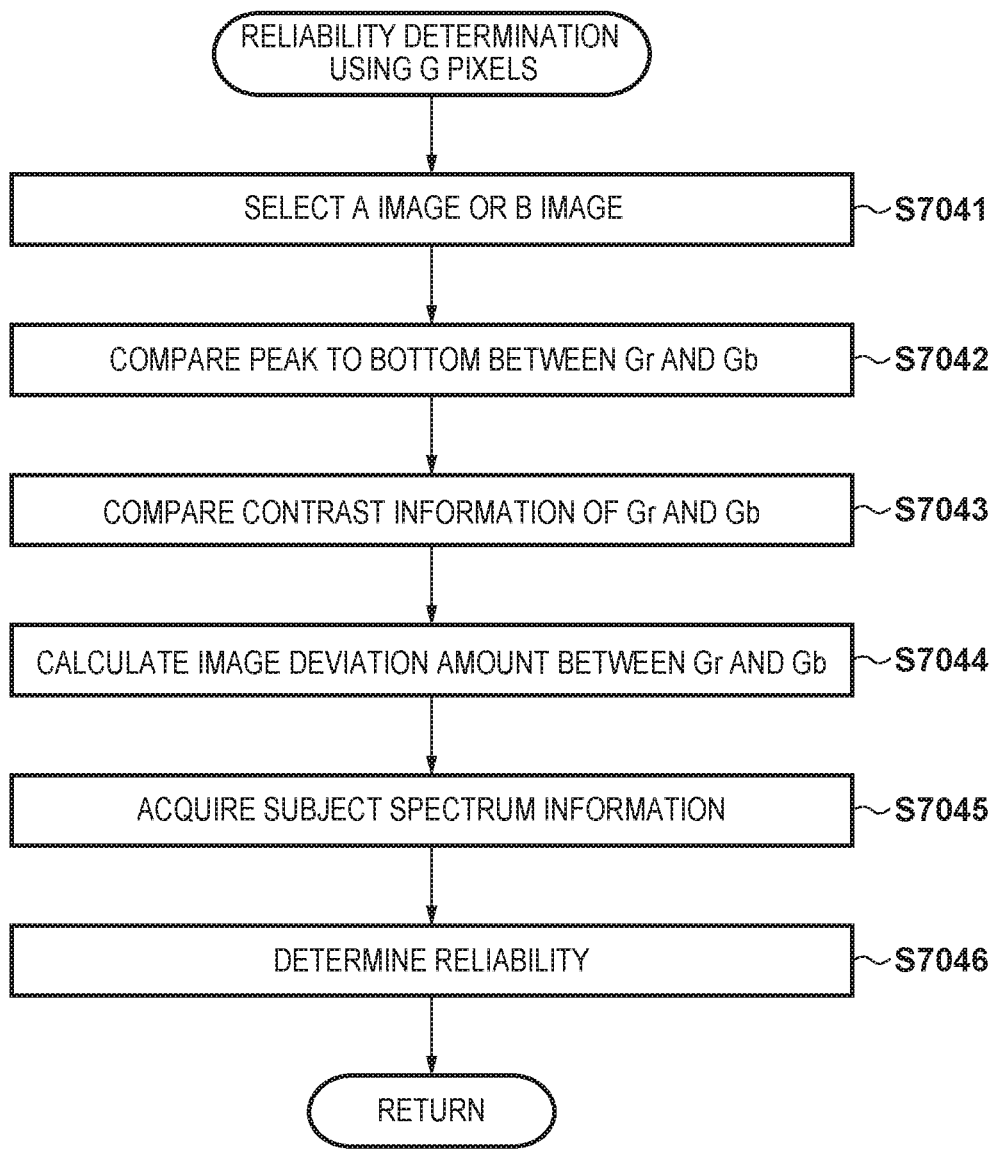
FIG. 13 is a flowchart showing an example of a reliability determination method in an embodiment.

Next, a subroutine of reliability determination using G pixels that is performed in step S704 in FIG. 12 will be described with reference to the flowchart in FIG. 13. In step S7041, the AF unit 42 selects signals for which reliability determination is performed. As described above, the effect of crosstalk is larger on signals whose light amount is small due to vignetting, and thus signals whose light amount is small are selected. In the situation described with reference to FIG. 10B, the B image is selected.

Figure 14:
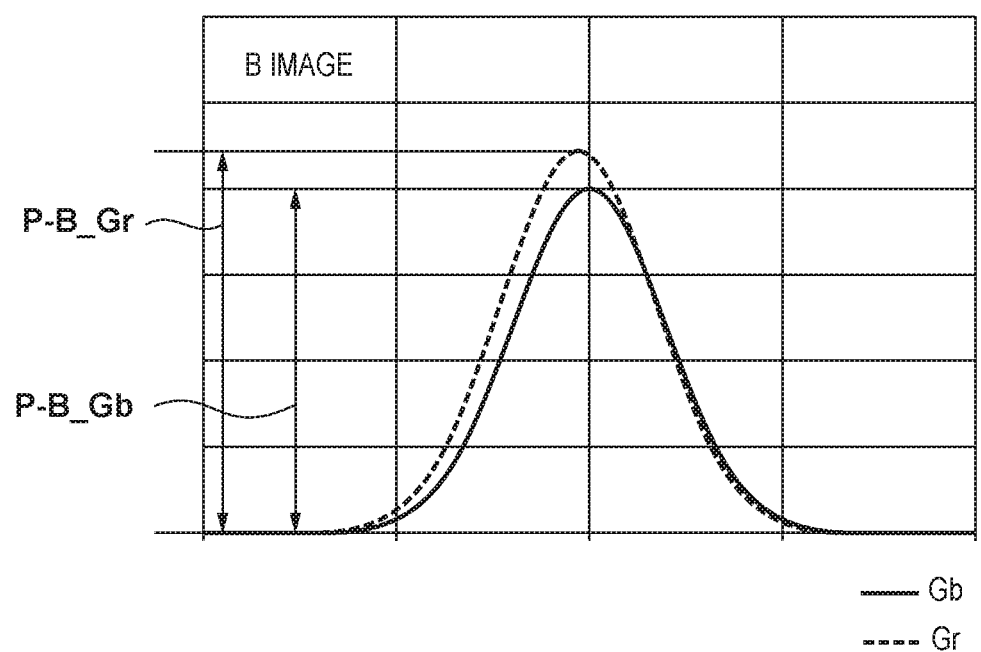
FIG. 14 is a diagram showing a difference between two signals in an embodiment.

In step S7041 onward, the AF unit 42 compares signals of Gr of the B image and Gb of the B image. Contents of subsequent comparison processing will be described with reference to FIG. 14. In FIG. 14, signals of Gr and Gb of the B image in FIG. 10B are extracted and enlarged in the vertical axial direction for ease of understanding.

In step S7042, the AF unit 42 compares the difference between a peak and a bottom in two signals. As shown in FIG. 14, P-B_Gr and P-B_Gb that are peaks of the two signals are compared. In the case where there is a difference that is larger than or equal to a predetermined threshold, the effect of crosstalk is large, and it is determined that the reliability of focus detection using all of the signals is low. Focus detection using all of the signals refers to focus detection using Y signals that is performed in step S706. In this embodiment, in the case where it is determined that the reliability of focus detection using Y signals is low, focus detection using signals that underwent weighting processing for each color as described above in step S707 is performed.

In step S7043, the AF unit 42 compares contrast information of Gr and Gb. It suffices that the absolute value sum of the difference between adjacent signals, the square sum of the difference between adjacent signals, or the like is used as contrast information. Accordingly, the intensity difference of amplitude of signals can be detected. In step S7043, in the case where it is found that there is a difference in contrast information of Gr and Gb that is larger than or equal to a predetermined threshold, it is concerned that the effect of crosstalk is large, and thus it is determined that the reliability of focus detection using all of the signals is low.

In step S7044, the AF unit 42 detects an image deviation amount between Gr and Gb of the B image. An image deviation amount detecting method that is performed during focus detection to be described later is used for calculating an image deviation amount. Determination in steps S7042 and S7043 is reliability determination that is focused on the light amount (amplitude) of crosstalk, but, in step S7044, deviation (difference in phase) of the position of the centroid of signals due to crosstalk is detected, and the reliability is determined. A method for calculating an image deviation amount will be described in the following description of a focus detection method. In step S7044, in the case where the image deviation amount between Gr and Gb of the B image is larger than or equal to a predetermined threshold, it is determined that the reliability of focus detection using all of the signals is low.

In step S7045, the AF unit 42 acquires subject spectrum information as output of the photometry unit 46, and estimate the effect of crosstalk due to subject spectrum. As described above, a focus detection error due to crosstalk is under various effects of the spectral characteristics. On the other hand, the closer the spectrum of a light beam received from the subject is to a single wavelength, the smaller the effects become. This is because magnification chromatic aberration does not occur in a single wavelength, sensitivity distribution of photodiodes with respect to the incident angle does not depend on the spectrum, and pixels from which outputs are obtained are restricted after a light beam passed through the color filters. In step S7045, it is determined whether or not the subject spectrum is close to the single wavelength, and the degree of the effect of crosstalk is determined.

In addition, in step S7045, also in the case where the subject spectrum is not a single wavelength, the degree of the effect of crosstalk is further determined. In steps S7042 to S7044, the effect of crosstalk is determined using Gr and Gb of the B image. However, in the case where the spectrum of the subject includes a large amount of red and blue components and a small amount of green components, the influence on the focus detection result is small even if there is a difference between Gr and Gb of the B image. In view of this, in step S7045, the rate of green output to the entire light amount is calculated using output of the photometry unit 46, and in the case where the ratio of green is larger than or equal to a predetermined threshold, it is determined that the effect of crosstalk is large, and it is determined that the reliability of focus detection using all of the signals is low.

In step S7046, the AF unit 42 comprehensively determines the reliability of focus detection using all of the signals, based on the result of reliability determination performed in steps S7042 to S7045. The reliability of the determination results in steps S7042 to S7044 is determined to be high, only in the case where it is determined that the reliability is high in all of the signals. If the degree of the effect is considered to be small also in the case where it is determined in steps S7042 to S7044 that the reliability is low using the result obtained in steps S7045, the reliability of focus detection using all of the signals is determined to be high.

When step S7046 is complete, the AF unit 42 ends the subroutine of reliability determination using G pixels, and advances the procedure to step S705 in FIG. 12.

In this embodiment, as described above, the amount of crosstalk differs according to the following factors:
the spectral characteristics of the subject (RGB ratio);
angle dependence and spectral dependence of sensitivity distribution of a pair of photodiodes with respect to the incident angle:
the imaging optical system and the image height of the focus detection region;
magnification chromatic aberration that occurs in the imaging optical system; and
the crosstalk amount between pixels (for each direction in which crosstalk travels from adjacent pixels).

Therefore, the amount of errors that occur during focus detection is affected by the degree of above-described factors. Therefore, it is sufficient that thresholds of determinations used during reliability determination using G pixels are changed in light of the above-described factors. For example, it suffices for the thresholds to be set such that reliability determination can be more strictly performed in the case of a higher image height, a larger magnification chromatic aberration amount, and a larger crosstalk amount. Note that, in this embodiment, an example has been described in which two photoelectric conversion portions are provided in one pixel in the horizontal direction, but the crosstalk amount between pixels differs also according to the arrangement direction and the number of photoelectric conversion portions. Therefore, reliability determination may be performed taking these factors into consideration in order to perform more accurate determination.

Next, a subroutine of processing for calculating a defocus amount that is performed by the AF unit 42 in step S708 in FIG. 12 will be further described with reference to the flowchart shown in FIG. 15. In step S7081, the AF unit 42 selects a row that is a calculation target from a plurality of rows in a focus detection region, and performs correlation calculation. In this embodiment, the first row of the signals of two rows and N columns that underwent signal generation in steps S706 and S707 is selected.

In focus detection of a phase difference detection method, a pair of images having a portion corresponding to the same subject are generated, a phase difference (deviation amount) of the pair of images is detected, and the phase difference is converted into a defocus amount and a defocus direction. A sequence of signals (an A image) that are based on signals obtained from the photodiodes 201*a* of a plurality of pixels 200 that are in a predetermined direction (e.g., the horizontal direction) and a sequence of signals (a B image) that are based on signals obtained from the photodiodes 201*b* are equivalent to images of the same subject viewed from different viewpoints. Therefore, by detecting the phase difference between the A image and the B image, and converting the phase difference into a defocus amount and a defocus direction, focus detection of a phase difference detection method can be realized.

It is then possible to calculate a value (correlation amount) indicating the correlation between the A image and the B image at individual positions while changing the relative distance (shift amount) between the A image and the B image in a predetermined direction, and detect a shift amount at which the correlation is the highest as a phase difference between the A image and the B image. For example, the correlation amount may be a difference accumulation value of corresponding signal values, or may be another value.

For example, assuming that A (1, 1) to A (1, N) are generated as an A image, and B (1, 1) to B (1, N) are generated as a B image, and the shift amount k is changed in units of pixels in the range of –kmax≤k≤kmax, the correlation amount COR (k) at each relative position can be calculated as follows. Note that, here, A (M, N) and B (M, N) respectively indicate a signal of the A pixel and a signal of the B pixel in an M-th row and an N-th column.

$$COR(k) = \sum_{i=1}^{N-1-2\times kmax} |A(i-k) - B(i+k)| \quad (1)$$

$$(-kmax \le k \le kmax)$$

In step S7081, a correlation amount COR is calculated from the signals of the A image and the B image of the selected row.

In step S7082, determination regarding row addition of correlation amounts is performed. There are a plurality of rows in a focus detection region, and in the case of performing correlation calculation, addition of correlation amounts is performed. Note that, there are some rows from which a reliable focus detection result is not obtained due to saturation, from among rows in which correlation calculation is performed. Therefore, determination is made regarding whether or not to add the correlation amount obtained in step S7082 to a correlation amount added in advance. In the case where the reliability of the correlation amount calculated in step S7081 is high, it is determined to perform addition.

In step S7083, in the case of performing addition based on the result of determination performed in step S7082, the procedure advances to step S7084, and the correlation amount obtained in step S7081 is added to the addition result of correlation amounts obtained in advance. On the other hand, if it is determined in step S7083 not to perform addition, step S7084 is skipped.

Next, in step S7085, it is determined whether or not correlation calculation has been performed on all of the rows. If correlation calculation has not been performed on all of the rows, the procedure returns to step S7081, and the procedure continues. If correlation calculation has been performed on all of the rows in the focus detection region, the procedure advances to step S7086, where a defocus amount is calculated. First, the value of the shift amount k at which COR (k) obtained after addition is minimized is obtained. Here, the shift amount k calculated in Expression 1 is an integer, but the shift amount k that is lastly obtained is a real number in order to improve the resolution. For example, in the case where a minimum value that is obtained in Expression 1 is COR(a), based on interpolation calculation using COR (a−1), COR (a), and COR (a+1), and the like, a shift amount that is a real number value, and at which the correlation amount in this section is minimized is obtained.

In this embodiment, a shift amount dk at which the sign of the difference value of the correlation amount COR changes is calculated as the shift amount k at which a correlation amount COR1 (k) is minimized.

First, the AF unit 42 calculates a difference value DCOR of the correlation amount in accordance with Expression 2 below.

$$DCOR(k)=COR1(k)-COR1(k-1) \quad (2)$$

The AF unit 42 then obtains the shift amount dk at which the sign of difference amount changes using the difference value DCOR of the correlation amount. Letting that the value of k immediately before the sign of the difference amount changes be k1, and the value of k at which the sign changed be k2 (k2=k1+1), the AF unit 42 calculates the shift amount dk in accordance with Expression 3 below.

$$dk=k1+|DCOR(k1)|/|DCOR(k1)-DCOR(k2)| \quad (3)$$

In this manner, the AF unit 42 calculates the shift amount dk at which the correlation amount between an A image and a B image is the largest in units of sub pixels. Note that a method for calculating a phase difference of two one-dimensional image signals is not limited to those described here, and any known method can be used.

Subsequently, the shift amount dk obtained in step S7086 is multiplied by a predetermined defocus conversion coefficient, and is converted into a defocus amount Def. Here, the defocus conversion coefficient can be obtained based on optical conditions (e.g., aperture, exit pupil distance, and lens frame information) during shooting, the image height of a focus detection region, the sampling pitch of signals constituting an A image and a B image, and the like.

When calculation of a defocus amount is complete in step S7086, a subroutine of processing for calculating a defocus amount ends, and the procedure advances to step S709 in FIG. 12.

As described above, according to this embodiment, reliability determination is performed by detecting the difference of feature amounts of signals, using two signals (Gr and Gb) from which the same output is essentially envisioned to be obtained by sampling a subject image passing through a taking lens. With such a configuration, even in the case where signals include an error due to the effect of crosstalk, crosstalk correction, and the like, a highly reliable focus detection result can be obtained in terms of detection accuracy.

Furthermore, selection of signals that are used when performing focus detection processing is realized through weighting addition for each color during signal compression, based on the reliability determination result. Accordingly, only in the case where there is an effect of crosstalk, affected signals are excluded, and an accurate focus detection result can be obtained. In addition, in the case where there is no effect of crosstalk, it is possible to obtain a focus detection result with a favorable SN ratio by using all of the signals.

In this embodiment, weighting addition for each color during signal compression is performed based on a reliability determination result, but a method for obtaining a focus detection result from which the effect of crosstalk is excluded is not limited thereto. For example, after focus detection results are calculated for the colors (Gr, Gb, R and B), the focus detection results may be weighted and averaged based on the reliability determination result.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-169605, filed Sep. 4 2017, which is hereby incorporated by reference herein in its entirety.

What is claimed is:

1. An image capturing apparatus comprising:
    an image sensor that has a plurality of two-dimensionally arrayed pixels, each of the pixels having a first photoelectric conversion portion that receives a light beam passing through a first pupil region of an exit pupil of an imaging optical system and a second photoelectric conversion portion that receives a light beam passing through a second pupil region of the exit pupil of the imaging optical system different from the first pupil region;
    a generation unit configured to generate a first image signal, in a pupil divided direction, based on a first signal obtained by combining a signal of the first photoelectric conversion portion to a signal of another neighboring first photoelectric conversion portion, and generate a second image signal, in the pupil divided direction, based on a second signal obtained by combining a signal of the second photoelectric conversion portion to a signal of another neighboring second photoelectric conversion portion; and
    a focus detection unit configured to detect a phase difference between the first image signal and the second image signal,
    wherein, in a case of combining a signal of the first photoelectric conversion portion to a signal of another neighboring first photoelectric conversion portion, or combining a signal of the second photoelectric conversion portion to a signal of another neighboring second photoelectric conversion portion, the generation unit decreases weighting of a signal of a photoelectric conversion portion in which an effect of crosstalk from a neighboring photoelectric conversion portion is large, and performs combining.

2. The image capturing apparatus according to claim 1, further comprising:
    a determination unit configured to determine a reliability of a detection result of the focus detection unit,
    wherein, in a case where the determination unit determines that a reliability is low, in a case of combining a signal of the first photoelectric conversion portion to a signal of another neighboring first photoelectric conversion portion, or combining a signal of the second photoelectric conversion portion to a signal of another neighboring second photoelectric conversion portion, the generation unit decreases weighting of a signal of a photoelectric conversion portion in which an effect of crosstalk from a neighboring photoelectric conversion portion is large, and performs combining.

3. The image capturing apparatus according to claim 1, further comprising:
    a determination unit configured to determine a reliability of a detection result of the focus detection unit
    wherein, in a case where the determination unit determines that a reliability is high, in a case of combining a signal of the first photoelectric conversion portion to a signal of another neighboring first photoelectric conversion portion, or combining a signal of the second photoelectric conversion portion to a signal of another neighboring second photoelectric conversion portion, the generation unit performs combining without weighting a signal of another neighboring photoelectric conversion portion.

4. The image capturing apparatus according to claim 3, wherein each of the plurality of pixels has one of red, green, and blue color filters, and the generation unit generates the first or second combined signal that is a luminance signal, by combining signals of the first or second photoelectric conversion portions respectively corresponding to color filters of different colors.

5. The image capturing apparatus according to claim 2, wherein each of the plurality of pixels has one of red, green, and blue color filters, and the determination unit determines the reliability using a signal of a photoelectric conversion portion corresponding to a green color filter.

6. The image capturing apparatus according to claim 5, wherein, regarding the color filters, a row in which red and green are alternately arranged and a row in which green and blue are alternately arranged are alternately arrayed, and the determination unit determines the reliability by comparing signals of photoelectric conversion portions corresponding to green color filters of the row in which red and green are alternately arranged and signals of photoelectric conversion portions corresponding to green color filters of the row in which green and blue are alternately arranged.

7. The image capturing apparatus according to claim 5, wherein the determination unit determines the reliability based on a spectral characteristics of a subject.

8. The image capturing apparatus according to claim 1, wherein the generation unit changes weighting of a signal of a photoelectric conversion portion in which an effect of crosstalk from the neighboring photoelectric conversion portion is large, according to a difference between an exit pupil distance of the imaging optical system and a set pupil distance of the image sensor.

9. The image capturing apparatus according to claim 1, wherein the generation unit changes weighting of a signal of a photoelectric conversion portion in which an effect of crosstalk from the neighboring photoelectric conversion portion is large, according to an image height of the pixel that is a distance from a center of the image sensor.

10. The image capturing apparatus according to claim 1, wherein the generation unit changes weighting of a signal of a photoelectric conversion portion in which an effect of crosstalk from the neighboring photoelectric conversion portion is large, according to information regarding aberration of the imaging optical system.

11. The image capturing apparatus according to claim 1, wherein the generation unit changes weighting of a signal of a photoelectric conversion portion in which an effect of crosstalk from the neighboring photoelectric conversion portion is large, according to spectral information of signals of a focus detection region.

12. A controlling method of an image capturing apparatus including an image sensor that has a plurality of two-dimensionally arrayed pixels, each of the pixels having a first photoelectric conversion portion that receives a light beam passing through a first pupil region of an exit pupil of an imaging optical system and a second photoelectric conversion portion that receives a light beam passing through a second pupil region of the exit pupil of the imaging optical system different from the first pupil region, the method comprising:
generating a first image signal by connecting, in a pupil divided direction, based on a first combined signal obtained by combining a signal of the first photoelectric conversion portion to a signal of another neighboring first photoelectric conversion portion, and generating a second image signal, in the pupil divided direction, based on a second combined signal obtained by combining a signal of the second photoelectric conversion portion to a signal of another neighboring second photoelectric conversion portion; and
detecting a phase difference between the first image signal and the second image signal,
wherein, in the generating, in a case of combining a signal of the first photoelectric conversion portion to a signal of another neighboring first photoelectric conversion portion, or combining a signal of the second photoelectric conversion portion to a signal of another neighboring second photoelectric conversion portion, weighting of a signal of a photoelectric conversion portion in which an effect of crosstalk from a neighboring photoelectric conversion portion is large is decreased, and combining is performed.

13. The method according to claim 12, further comprising:
determining a reliability of a detection result of the focus detecting,
wherein, in a case where it is determined that a reliability is low, in a case of combining a signal of the first photoelectric conversion portion to a signal of another neighboring first photoelectric conversion portion, or combining a signal of the second photoelectric conversion portion to a signal of another neighboring second photoelectric conversion portion, weighting of a signal of a photoelectric conversion portion in which an effect of crosstalk from a neighboring photoelectric conversion portion is large is decreased, and combining is performed.

14. The method according to claim 12, further comprising:
determining a reliability of a detection result of the focus detecting
wherein, in a case where it is determined that a reliability is high, in a case of combining a signal of the first photoelectric conversion portion to a signal of another neighboring first photoelectric conversion portion, or combining a signal of the second photoelectric conversion portion to a signal of another neighboring second photoelectric conversion portion, combining is performed without weighting a signal of another neighboring photoelectric conversion portion.

15. The method according to claim 14,
wherein each of the plurality of pixels has one of red, green, and blue color filters, and in the generating, the first or second combined signal that is a luminance signal is generated by combining signals of the first or second photoelectric conversion portions respectively corresponding to color filters of different colors.

16. The method according to claim 13,
wherein each of the plurality of pixels has one of red, green, and blue color filters, and in the determining, the reliability is determined using a signal of a photoelectric conversion portion corresponding to a green color filter.

17. The method according to claim 16,
wherein, regarding the color filters, a row in which red and green are alternately arranged and a row in which green and blue are alternately arranged are alternately arrayed, and in the determining the reliability is determined by comparing signals of photoelectric conversion portions corresponding to green color filters of the row in which red and green are alternately arranged and signals of photoelectric conversion portions corresponding to green color filters of the row in which green and blue are alternately arranged.

18. The method according to claim 12,
wherein in the generating weighting of a signal of a photoelectric conversion portion in which an effect of crosstalk from the neighboring photoelectric conversion portion is large is changed according to an image height of the pixel that is a distance from a center of the image sensor.

19. The method according to claim 12,
wherein in the generating weighting of a signal of a photoelectric conversion portion in which an effect of crosstalk from the neighboring photoelectric conversion portion is large is changed according to spectral information of signals of a focus detection region.

20. An image capturing apparatus comprising:

an image sensor that has a plurality of two-dimensionally arrayed pixels, each of the pixels having a first photoelectric conversion portion that receives a light beam passing through a first pupil region of an exit pupil of an imaging optical system and a second photoelectric conversion portion that receives a light beam passing through a second pupil region of the exit pupil of the imaging optical system different from the first pupil region; and at least one processor or circuit configured to perform the operations of the following units:

a generation unit configured to generate a first image signal, in a pupil divided direction, based on a first signal obtained by combining a signal of the first photoelectric conversion portion to a signal of another neighboring first photoelectric conversion portion, and generate a second image signal, in the pupil divided direction, based on a second signal obtained by combining a signal of the second photoelectric conversion portion to a signal of another neighboring second photoelectric conversion portion; and a focus detection unit configured to detect a phase difference between the first image signal and the second image signal, wherein, in a case of combining a signal of the first photoelectric conversion portion to a signal of another neighboring first photoelectric conversion portion, or combining a signal of the second photoelectric conversion portion to a signal of another neighboring second photoelectric conversion portion, the generation unit decreases weighting of a signal of a photoelectric conversion portion in which an effect of crosstalk from a neighboring photoelectric conversion portion is large, and performs combining.

* * * * *